United States Patent [19]
Sheppard et al.

[11] Patent Number: 5,817,744
[45] Date of Patent: Oct. 6, 1998

[54] PHENYLETHYNYL CAPPED IMIDES

[75] Inventors: Clyde H. Sheppard, Post Falls, Id.; Hyman R. Lubowitz, Rolling Hills Estates, Calif.

[73] Assignee: The Boeing Company, Seattle, Wash.

[21] Appl. No.: 801,835

[22] Filed: Feb. 14, 1997

Related U.S. Application Data

[62] Division of Ser. No. 477,560, Jun. 7, 1995, which is a continuation of Ser. No. 619,677, Nov. 29, 1990, Pat. No. 5,645,925, which is a continuation of Ser. No. 167,604, Mar. 14, 1988, abandoned.

[51] Int. Cl.[6] .............................. C08G 69/26; C08G 75/02
[52] U.S. Cl. .................... 528/353; 252/182.13; 528/170; 528/171; 528/185; 528/188; 528/322; 528/335
[58] Field of Search ...................... 252/182.13; 528/353, 528/322, 335, 170; 540/356

[56] References Cited

U.S. PATENT DOCUMENTS

| | | |
|---|---|---|
| H183 | 1/1987 | Karasz et al. . |
| Re. 29,316 | 7/1977 | Bargain et al. . |
| Re. 30,922 | 5/1982 | Heilman et al. . |
| 3,105,839 | 10/1963 | Renner . |
| 3,148,173 | 9/1964 | Axelrood . |
| 3,236,705 | 2/1966 | Gilman et al. . |
| 3,236,808 | 2/1966 | Goldberg et al. . |
| 3,262,914 | 7/1966 | Goldberg et al. . |
| 3,265,708 | 8/1966 | Stiteler . |
| 3,267,081 | 8/1966 | Rudner et al. . |
| 3,313,783 | 4/1967 | Iwakura et al. . |
| 3,354,129 | 11/1967 | Edmonds et al. . |
| 3,355,272 | 11/1967 | D'Alessandro . |
| 3,386,969 | 6/1968 | Levine . |
| 3,408,349 | 10/1968 | Matsunaga . |
| 3,431,235 | 3/1969 | Lubowitz . |
| 3,435,003 | 3/1969 | Craven . |
| 3,449,442 | 6/1969 | Williams et al. . |
| 3,450,711 | 6/1969 | Megna et al. . |
| 3,453,236 | 7/1969 | Culbertson . |
| 3,454,673 | 7/1969 | Schmidt . |
| 3,458,486 | 7/1969 | Ray et al. . |
| 3,461,461 | 8/1969 | Anthony et al. . |
| 3,525,717 | 8/1970 | Butler et al. . |
| 3,528,950 | 9/1970 | Lubowitz . |
| 3,530,087 | 9/1970 | Hayes et al. . |

(List continued on next page.)

FOREIGN PATENT DOCUMENTS

| | | |
|---|---|---|
| 1175998 | 9/1984 | Canada . |
| 1269576 | 5/1990 | Canada . |
| 0152372 | 1/1985 | European Pat. Off. . |
| 0175484 | 5/1986 | European Pat. Off. . |
| 0067976 | 3/1987 | European Pat. Off. . |
| 0283636 | 1/1988 | European Pat. Off. . |
| 0289695 | 1/1988 | European Pat. Off. . |
| 0277476 | 8/1988 | European Pat. Off. . |
| 0266662 | 11/1988 | European Pat. Off. . |
| 0289798 | 11/1988 | European Pat. Off. . |
| 0292434 | 11/1988 | European Pat. Off. . |
| 0292677 | 11/1988 | European Pat. Off. . |
| 0294555 | 12/1988 | European Pat. Off. . |
| 0132547 | 2/1989 | European Pat. Off. . |
| 0305882 | 3/1989 | European Pat. Off. . |
| 0309649 | 4/1989 | European Pat. Off. . |
| 0310735 | 4/1989 | European Pat. Off. . |
| 0311735 | 4/1989 | European Pat. Off. . |
| 0317754 | 5/1989 | European Pat. Off. . |
| 0323540 | 7/1989 | European Pat. Off. . |
| 0336856 | 10/1989 | European Pat. Off. . |
| 0405128 | 1/1991 | European Pat. Off. . |
| 0418406 | 3/1991 | European Pat. Off. . |
| 0334778 | 4/1992 | European Pat. Off. . |
| 71.00975 | 1/1971 | France . |

(List continued on next page.)

OTHER PUBLICATIONS

Vinogradova et al., Chem. Abs. 67:100458, Vysokomal. Soedin., Ser. A (1967) 9(8) 1797–1801.

Harris et al., "Synthesis and Characterization of Reactive End–Capped Polyimide Oligomers" Polym. Prep. 24(2), 324–325, Aug., 1983.

Harris et al., "Synthesis and Characterization of Reactive End–Capped Polyimide Oligomers," J. Macromd. Sci–Chem., A21(8&9), 1117–1135, Oct. 1984.

St. Clair, et al., *Additives Lower Pickup of Moisture by Polyimides* NASA Tech Briefs, 80–81, Apr., 1989.

Heidemann, *"Oligomers"* Encyclopedia of Polymer Science and Technology vol. 9 Molding to Petroleum Resins 485–506, 1968.

*Second–generation polyimide raises continuous–use temperatures* Advanced Composites, May/Jun., 1988.

Vanucci et al., *700° F. Properties of Autoclave Cured PMR–II Composites* NASA Tech. Memo 100923 Sep., 1988.

Vanucci, *PMR Polyimide Compositions for Improved Performance at 371° C.* NTIS N87–16071 Apr., 1987.

Elsenbaumer et al., *Highly Conductive Meta Derivatives of Poly(phenylene Sulfide)* J. Polymer Sci: Polymer Phys. Ed., vol. 20, 1781–1787 1982.

(List continued on next page.)

*Primary Examiner*—Richard D. Lovering
*Attorney, Agent, or Firm*—John C. Hammar

[57] ABSTRACT

The physical properties of high performance composites can be tailored by using blends to make the composites. The resulting composites are relatively easy to make and have long-term, high performance capabilities even in harsh service conditions. The blends of the present invention include at least one oligomer having an aromatic, aliphatic, or mixed aromatic and aliphatic backbone from one chemical family and an unsaturated hydrocarbon end cap and at least one polymer from a different chemical family. Upon curing, the oligomer in the blend addition polymerize to form composites possessing advanced properties with respect to those exhibited by the pure oligomer or the pure polymer. Coreactive oligomer blends can be used instead of a pure oligomer to form composites that include addition polymers, block copolymers, and the compatible polymer, thereby further achieving a tailoring of properties in the cured composite. The blends can be prepregged and cured to form composites.

13 Claims, No Drawings

U.S. PATENT DOCUMENTS

| | | |
|---|---|---|
| 3,536,670 | 10/1970 | Aeiony et al. . |
| 3,562,223 | 2/1971 | Bargain et al. . |
| 3,563,951 | 2/1971 | Dormagen et al. . |
| 3,565,549 | 2/1971 | Lubowitz et al. . |
| 3,592,841 | 7/1971 | Broadhead . |
| 3,598,768 | 8/1971 | Bach . |
| 3,609,181 | 9/1971 | Lubowitz et al. . |
| 3,616,193 | 10/1971 | Lubowitz et al. . |
| 3,624,042 | 11/1971 | Lubowitz et al. . |
| 3,631,222 | 12/1971 | Vogel . |
| 3,632,428 | 1/1972 | Lubowitz et al. . |
| 3,635,891 | 1/1972 | Lubowitz et al. . |
| 3,641,207 | 2/1972 | Lauchlan . |
| 3,647,529 | 3/1972 | Lubowitz et al. . |
| 3,652,710 | 3/1972 | Holub . |
| 3,658,764 | 4/1972 | Bargain et al. ............... 528/322 X |
| 3,658,938 | 4/1972 | Kwiatkowski et al. . |
| 3,663,507 | 5/1972 | Vogel . |
| 3,689,464 | 9/1972 | Holub et al. . |
| 3,697,308 | 10/1972 | Lubowitz et al. . |
| 3,697,345 | 10/1972 | Lubowitz et al. . |
| 3,699,074 | 10/1972 | Lubowitz et al. . |
| 3,699,075 | 10/1972 | Lubowitz . |
| 3,708,370 | 1/1973 | Lubowitz et al. . |
| 3,708,439 | 1/1973 | Sayigh et al. . |
| 3,708,459 | 1/1973 | Lubowitz . |
| 3,729,446 | 4/1973 | Holub et al. . |
| 3,745,149 | 7/1973 | Serafini et al. . |
| 3,748,311 | 7/1973 | Burns et al. . |
| 3,748,312 | 7/1973 | Burns et al. . |
| 3,749,722 | 7/1973 | Holub . |
| 3,749,735 | 7/1973 | Loria . |
| 3,757,088 | 9/1973 | Osborn . |
| 3,759,777 | 9/1973 | Lubowitz et al. . |
| 3,761,441 | 9/1973 | D'Alessandro et al. . |
| 3,763,101 | 10/1973 | Jones et al. . |
| 3,770,697 | 11/1973 | Holub et al. . |
| 3,772,250 | 11/1973 | Economy et al. . |
| 3,773,718 | 11/1973 | Klebe et al. . |
| 3,781,240 | 12/1973 | Lubowitz et al. . |
| 3,781,249 | 12/1973 | Lubowitz . |
| 3,803,081 | 4/1974 | Lubowitz . |
| 3,812,159 | 5/1974 | Lubowitz . |
| 3,827,927 | 8/1974 | Lubowitz et al. . |
| 3,839,287 | 10/1974 | Kwiatkowski et al. . |
| 3,843,593 | 10/1974 | Shell et al. . |
| 3,847,867 | 11/1974 | Heath et al. . |
| 3,847,869 | 11/1974 | Williams, III . |
| 3,853,815 | 12/1974 | Lubowitz . |
| 3,859,252 | 1/1975 | Cho . |
| 3,879,349 | 4/1975 | Bilow et al. . |
| 3,879,393 | 4/1975 | Havera . |
| 3,879,428 | 4/1975 | Heath et al. . |
| 3,887,582 | 6/1975 | Holub et al. . |
| 3,890,272 | 6/1975 | D'Alelio . |
| 3,895,064 | 7/1975 | Brode et al. . |
| 3,896,147 | 7/1975 | Stephen . |
| 3,897,395 | 7/1975 | D'Alelio . |
| 3,909,507 | 9/1975 | Betts et al. . |
| 3,914,334 | 10/1975 | Lubowitz et al. . |
| 3,919,177 | 11/1975 | Campbell . |
| 3,920,768 | 11/1975 | Kwiatkowski . |
| 3,925,324 | 12/1975 | Gerard . |
| 3,933,862 | 1/1976 | Williams, III . |
| 3,935,167 | 1/1976 | Marvel et al. . |
| 3,935,320 | 1/1976 | Chiu et al. . |
| 3,941,746 | 3/1976 | Stephen . |
| 3,953,420 | 4/1976 | Dimroth et al. . |
| 3,956,320 | 5/1976 | Heath et al. . |
| 3,957,732 | 5/1976 | Hirooka et al. . |
| 3,957,862 | 5/1976 | Heath et al. . |
| 3,966,678 | 6/1976 | Gruffaz et al. . |
| 3,966,726 | 6/1976 | Toth et al. . |
| 3,966,987 | 6/1976 | Suzuki et al. . |
| 3,970,714 | 7/1976 | Bargain . |
| 3,972,902 | 8/1976 | Heath et al. . |
| 3,988,344 | 10/1976 | Nakaoji . |
| 3,988,374 | 10/1976 | Brode et al. . |
| 3,991,026 | 11/1976 | Matsuda et al. . |
| 3,993,630 | 11/1976 | Darmory et al. . |
| 3,998,786 | 12/1976 | D'Alelio . |
| 4,000,146 | 12/1976 | Gerber . |
| 4,005,134 | 1/1977 | Markezich . |
| 4,005,154 | 1/1977 | Bargain . |
| 4,013,600 | 3/1977 | Cassat . |
| 4,020,069 | 4/1977 | Johnson et al. . |
| 4,026,871 | 5/1977 | D'Alelio . |
| 4,038,261 | 7/1977 | Crouch et al. . |
| 4,051,177 | 9/1977 | Braden et al. . |
| 4,055,543 | 10/1977 | D'Alelio . |
| 4,058,505 | 11/1977 | D'Alelio . |
| 4,060,515 | 11/1977 | D'Alelio . |
| 4,064,289 | 12/1977 | Yokoyama et al. . |
| 4,075,171 | 2/1978 | D'Alelio . |
| 4,097,456 | 6/1978 | Barie . |
| 4,100,137 | 7/1978 | Lemieux et al. . |
| 4,100,138 | 7/1978 | Bilow et al. . |
| 4,101,488 | 7/1978 | Ishizuka et al. . |
| 4,107,147 | 8/1978 | Williams, III et al. . |
| 4,107,153 | 8/1978 | Akijama et al. . |
| 4,107,174 | 8/1978 | Baumann et al. . |
| 4,108,837 | 8/1978 | Johnson et al. . |
| 4,108,926 | 8/1978 | Arnold et al. . |
| 4,111,879 | 9/1978 | Mori et al. . |
| 4,115,231 | 9/1978 | Darms et al. . |
| 4,115,362 | 9/1978 | Inata et al. . |
| 4,116,937 | 9/1978 | Jones et al. . |
| 4,124,593 | 11/1978 | Gschwend et al. . |
| 4,126,619 | 11/1978 | Darms et al. . |
| 4,128,574 | 12/1978 | Markezich et al. . |
| 4,132,715 | 1/1979 | Roth . |
| 4,132,716 | 1/1979 | Kvita et al. . |
| 4,134,895 | 1/1979 | Roth et al. . |
| 4,142,870 | 3/1979 | Lovejoy . |
| 4,158,731 | 6/1979 | Baumann et al. . |
| 4,166,168 | 8/1979 | D'Alelio . |
| 4,167,663 | 9/1979 | Granzow et al. . |
| 4,168,366 | 9/1979 | D'Alelio ............... 528/353 X |
| 4,172,836 | 10/1979 | Baumann et al. . |
| 4,174,326 | 11/1979 | Baumann et al. . |
| 4,175,175 | 11/1979 | Johnson et al. . |
| 4,176,223 | 11/1979 | Irwin . |
| 4,179,551 | 12/1979 | Jones et al. . |
| 4,183,839 | 1/1980 | Gagliani . |
| 4,187,364 | 2/1980 | Darms et al. . |
| 4,189,560 | 2/1980 | Roth et al. . |
| 4,193,927 | 3/1980 | Baumann et al. . |
| 4,197,397 | 4/1980 | D'Alelio . |
| 4,200,731 | 4/1980 | Massey et al. . |
| 4,206,106 | 6/1980 | Heilman et al. . |
| 4,218,555 | 8/1980 | Antonoplos et al. ............... 528/353 X |
| 4,221,895 | 9/1980 | Woo . |
| 4,225,497 | 9/1980 | Baudouin et al. . |
| 4,225,498 | 9/1980 | Baudouin et al. . |
| 4,231,934 | 11/1980 | Oba et al. . |
| 4,234,712 | 11/1980 | Keller et al. . |
| 4,237,262 | 12/1980 | Jones . |
| 4,239,883 | 12/1980 | Stenzenberger . |
| 4,244,853 | 1/1981 | Serafini et al. . |
| 4,250,096 | 2/1981 | Kvita et al. . |
| 4,251,417 | 2/1981 | Chow et al. ............... 528/353 X |
| 4,251,418 | 2/1981 | Chow et al. . |

| | | |
|---|---|---|
| 4,251,419 | 2/1981 | Heilman et al. . |
| 4,251,420 | 2/1981 | Antonoplos et al. . |
| 4,255,313 | 3/1981 | Antonoplos et al. . |
| 4,266,047 | 5/1981 | Jablonski et al. . |
| 4,269,961 | 5/1981 | Jones et al. . |
| 4,271,079 | 6/1981 | Maeda et al. . |
| 4,273,916 | 6/1981 | Jones . |
| 4,276,407 | 6/1981 | Bilow et al. ............. 528/353 X |
| 4,288,583 | 9/1981 | Zahir et al. . |
| 4,288,607 | 9/1981 | Bier et al. . |
| 4,289,699 | 9/1981 | Oba et al. . |
| 4,293,670 | 10/1981 | Robeson et al. . |
| 4,297,472 | 10/1981 | Heiss . |
| 4,297,474 | 10/1981 | Williams, III et al. . |
| 4,298,720 | 11/1981 | Yamazaki et al. . |
| 4,299,750 | 11/1981 | Antonoplos et al. ............. 528/353 X |
| 4,299,946 | 11/1981 | Balme et al. . |
| 4,302,575 | 11/1981 | Takekoshi . |
| 4,323,662 | 4/1982 | Oba et al. . |
| 4,338,222 | 7/1982 | Limburg et al. . |
| 4,338,225 | 7/1982 | Sheppard . |
| 4,344,869 | 8/1982 | Blinne et al. . |
| 4,344,870 | 8/1982 | Blinne et al. . |
| 4,351,932 | 9/1982 | Street et al. . |
| 4,358,561 | 11/1982 | Keske et al. . |
| 4,360,644 | 11/1982 | Naarmann et al. . |
| 4,365,068 | 12/1982 | Darms et al. . |
| 4,375,427 | 3/1983 | Miller et al. . |
| 4,376,710 | 3/1983 | Gardos et al. . |
| 4,381,363 | 4/1983 | Reinhart, Jr. . |
| 4,389,504 | 6/1983 | St. Clair et al. . |
| 4,393,188 | 7/1983 | Takahashi et al. . |
| 4,395,497 | 7/1983 | Naarmann et al. . |
| 4,400,613 | 8/1983 | Popelish . |
| 4,405,770 | 9/1983 | Schoenberg et al. . |
| 4,407,739 | 10/1983 | Naarmann et al. . |
| 4,409,382 | 10/1983 | Keller . |
| 4,410,686 | 10/1983 | Hefner, Jr. et al. . |
| 4,414,269 | 11/1983 | Lubowitz et al. . |
| 4,417,039 | 11/1983 | Reinhardt et al. . |
| 4,417,044 | 11/1983 | Parekh . |
| 4,418,181 | 11/1983 | Monacelli . |
| 4,423,202 | 12/1983 | Choe . |
| 4,429,108 | 1/1984 | Stephens . |
| 4,438,273 | 3/1984 | Landis . |
| 4,438,280 | 3/1984 | Monacelli . |
| 4,446,191 | 5/1984 | Miyadera et al. . |
| 4,448,925 | 5/1984 | Hanson . |
| 4,460,783 | 7/1984 | Nishikawa et al. . |
| 4,465,809 | 8/1984 | Smith . |
| 4,467,011 | 8/1984 | Brooks et al. . |
| 4,476,184 | 10/1984 | Lubowitz et al. . |
| 4,476,295 | 10/1984 | Stephens . |
| 4,482,683 | 11/1984 | Quella et al. . |
| 4,485,140 | 11/1984 | Gannett et al. . |
| 4,485,231 | 11/1984 | Landis . |
| 4,489,027 | 12/1984 | St. Clair et al. . |
| 4,504,632 | 3/1985 | Holub et al. . |
| 4,507,466 | 3/1985 | Tomalia et al. . |
| 4,510,272 | 4/1985 | Loszewski . |
| 4,515,962 | 5/1985 | Renner . |
| 4,519,926 | 5/1985 | Basalay et al. . |
| 4,520,198 | 5/1985 | D'Alelio et al. . |
| 4,526,838 | 7/1985 | Fujioka et al. . |
| 4,533,692 | 8/1985 | Wolfe et al. . |
| 4,533,693 | 8/1985 | Wolfe et al. . |
| 4,533,724 | 8/1985 | Wolfe et al. . |
| 4,535,117 | 8/1985 | Mathis et al. . |
| 4,536,559 | 8/1985 | Lubowitz et al. . |
| 4,542,203 | 9/1985 | Veno et al. . |
| 4,543,203 | 9/1985 | Ueno et al. . |
| 4,547,553 | 10/1985 | Lubowitz et al. . |
| 4,555,563 | 11/1985 | Hefner, Jr. et al. . |
| 4,556,697 | 12/1985 | Curatolo et al. . |
| 4,556,705 | 12/1985 | McCready . |
| 4,558,120 | 12/1985 | Tomalia et al. . |
| 4,562,231 | 12/1985 | Dean . |
| 4,562,232 | 12/1985 | Smith . |
| 4,563,498 | 1/1986 | Lucas . |
| 4,563,514 | 1/1986 | Liu et al. . |
| 4,564,553 | 1/1986 | Pellegrini et al. . |
| 4,567,216 | 1/1986 | Qureshi et al. . |
| 4,567,240 | 1/1986 | Hergenrother et al. . |
| 4,568,737 | 2/1986 | Tomalia et al. . |
| 4,574,144 | 3/1986 | Yates, III et al. . |
| 4,574,148 | 3/1986 | Wicker, Jr. et al. . |
| 4,574,154 | 3/1986 | Okamoto et al. . |
| 4,576,857 | 3/1986 | Gannett et al. . |
| 4,577,034 | 3/1986 | Durvasula . |
| 4,578,433 | 3/1986 | Muenstedt et al. . |
| 4,578,470 | 3/1986 | Webb . |
| 4,579,916 | 4/1986 | Schmid et al. . |
| 4,584,364 | 4/1986 | Lubowitz et al. . |
| 4,587,329 | 5/1986 | Tomalia et al. . |
| 4,590,363 | 5/1986 | Bernard . |
| 4,599,383 | 7/1986 | Satoji . |
| 4,600,769 | 7/1986 | Kumar et al. . |
| 4,604,437 | 8/1986 | Renner . |
| 4,608,414 | 8/1986 | Kitsunai et al. . |
| 4,608,426 | 8/1986 | Stern . |
| 4,609,683 | 9/1986 | Grigsby, Jr. et al. . |
| 4,611,022 | 9/1986 | Hefner, Jr. . |
| 4,611,048 | 9/1986 | Peters . |
| 4,614,767 | 9/1986 | Dean . |
| 4,615,832 | 10/1986 | Kress et al. . |
| 4,616,070 | 10/1986 | Zeiner et al. . |
| 4,616,071 | 10/1986 | Holubka . |
| 4,617,390 | 10/1986 | Hoppe et al. . |
| 4,624,888 | 11/1986 | St. Clair et al. . |
| 4,628,067 | 12/1986 | Chen, Sr. et al. . |
| 4,628,079 | 12/1986 | Zecher et al. . |
| 4,629,777 | 12/1986 | Pfeifer . |
| 4,631,337 | 12/1986 | Tomalia et al. . |
| 4,638,027 | 1/1987 | Mark et al. . |
| 4,640,944 | 2/1987 | Brooks . |
| 4,649,080 | 3/1987 | Fischer et al. . |
| 4,654,410 | 3/1987 | Kashiwame et al. . |
| 4,657,973 | 4/1987 | Endo et al. . |
| 4,657,977 | 4/1987 | Peters . |
| 4,657,987 | 4/1987 | Rock et al. . |
| 4,657,990 | 4/1987 | Daoust et al. . |
| 4,660,057 | 4/1987 | Watanabe et al. . |
| 4,661,604 | 4/1987 | Lubowitz et al. . |
| 4,663,378 | 5/1987 | Allen . |
| 4,663,399 | 5/1987 | Peters . |
| 4,663,423 | 5/1987 | Yamada et al. . |
| 4,663,424 | 5/1987 | Stix et al. . |
| 4,663,425 | 5/1987 | Evers et al. . |
| 4,680,326 | 7/1987 | Leland et al. . |
| 4,680,377 | 7/1987 | Matsumura et al. . |
| 4,684,714 | 8/1987 | Lubowitz et al. . |
| 4,686,242 | 8/1987 | Turner et al. . |
| 4,690,972 | 9/1987 | Johnson et al. . |
| 4,691,025 | 9/1987 | Domeier et al. . |
| 4,694,064 | 9/1987 | Tomalia et al. . |
| 4,695,610 | 9/1987 | Egli et al. . |
| 4,699,975 | 10/1987 | Katto et al. . |
| 4,703,081 | 10/1987 | Blackwell et al. . |
| 4,708,983 | 11/1987 | Liang . |
| 4,709,004 | 11/1987 | Dai . |
| 4,709,006 | 11/1987 | Tsai et al. . |
| 4,709,008 | 11/1987 | Shimp . |
| 4,714,768 | 12/1987 | Hemkielm et al. . |
| 4,716,212 | 12/1987 | Gaughan . |

| | | |
|---|---|---|
| 4,719,283 | 1/1988 | Bartmann . |
| 4,727,118 | 2/1988 | Egami . |
| 4,728,742 | 3/1988 | Renner . |
| 4,730,030 | 3/1988 | Hahn et al. . |
| 4,730,630 | 3/1988 | Hahn et al. . |
| 4,737,550 | 4/1988 | Tomalia . |
| 4,739,030 | 4/1988 | Lubowitz et al. . |
| 4,739,075 | 4/1988 | Odagiri et al. . |
| 4,739,115 | 4/1988 | Byrd et al. . |
| 4,740,563 | 4/1988 | McCready et al. . |
| 4,740,564 | 4/1988 | McCready et al. . |
| 4,740,584 | 4/1988 | Shimp . |
| 4,742,166 | 5/1988 | Renner . |
| 4,748,227 | 5/1988 | Matzner et al. . |
| 4,755,584 | 7/1988 | Tomioka et al. . |
| 4,755,585 | 7/1988 | Hanson et al. . |
| 4,757,118 | 7/1988 | Das et al. . |
| 4,757,128 | 7/1988 | Domb et al. . |
| 4,757,150 | 7/1988 | Guggenheim et al. . |
| 4,759,986 | 7/1988 | Marikar et al. . |
| 4,760,106 | 7/1988 | Gardner et al. . |
| 4,764,427 | 8/1988 | Hara et al. . |
| 4,766,180 | 8/1988 | Wong . |
| 4,766,197 | 8/1988 | Clendinning et al. . |
| 4,769,424 | 9/1988 | Takekoshi et al. . |
| 4,769,426 | 9/1988 | Iwasaki et al. . |
| 4,769,436 | 9/1988 | Beck et al. . |
| 4,774,282 | 9/1988 | Qureshi . |
| 4,777,208 | 10/1988 | Hefner, Jr. . |
| 4,778,830 | 10/1988 | Streu et al. . |
| 4,778,859 | 10/1988 | Ai et al. . |
| 4,778,898 | 10/1988 | Vonlanthen et al. . |
| 4,786,669 | 11/1988 | Dewhirst . |
| 4,786,685 | 11/1988 | Takida et al. . |
| 4,786,713 | 11/1988 | Rule et al. . |
| 4,798,685 | 1/1989 | Yaniger . |
| 4,798,686 | 1/1989 | Hocker et al. . |
| 4,798,882 | 1/1989 | Petri . |
| 4,801,676 | 1/1989 | Hisgen et al. . |
| 4,801,677 | 1/1989 | Eckhardt et al. . |
| 4,804,722 | 2/1989 | Hesse et al. . |
| 4,804,724 | 2/1989 | Harris et al. . |
| 4,806,407 | 2/1989 | Skinner et al. . |
| 4,808,717 | 2/1989 | Saito et al. . |
| 4,812,518 | 3/1989 | Haubennestel et al. . |
| 4,812,534 | 3/1989 | Blakely . |
| 4,812,552 | 3/1989 | Cliffton et al. . |
| 4,812,588 | 3/1989 | Schrock . |
| 4,814,416 | 3/1989 | Poll . |
| 4,814,417 | 3/1989 | Sugimori . |
| 4,814,421 | 3/1989 | Rosenquist . |
| 4,814,472 | 3/1989 | Lau . |
| 4,816,503 | 3/1989 | Cunningham et al. . |
| 4,816,526 | 3/1989 | Bristowe et al. . |
| 4,816,527 | 3/1989 | Rock . |
| 4,816,556 | 3/1989 | Gay et al. . |
| 4,820,770 | 4/1989 | Schleifstein . |
| 4,826,927 | 5/1989 | Schmid et al. . |
| 4,826,997 | 5/1989 | Kirchhoff . |
| 4,827,000 | 5/1989 | Schwartz . |
| 4,829,138 | 5/1989 | Barthelemy . |
| 4,835,197 | 5/1989 | Mercer . |
| 4,837,256 | 6/1989 | Gardner et al. . |
| 4,839,378 | 6/1989 | Koyama et al. . |
| 4,845,150 | 7/1989 | Kovak et al. . |
| 4,845,167 | 7/1989 | Alston et al. . |
| 4,845,185 | 7/1989 | Teramoto et al. . |
| 4,845,278 | 7/1989 | Erhan . |
| 4,847,333 | 7/1989 | Lubowitz et al. . |
| 4,851,280 | 7/1989 | Gupta . |
| 4,851,287 | 7/1989 | Hartsing, Jr. . |
| 4,851,494 | 7/1989 | Eldin et al. . |
| 4,851,495 | 7/1989 | Sheppard et al. . |
| 4,851,496 | 7/1989 | Poll et al. . |
| 4,851,501 | 7/1989 | Lubowitz et al. . |
| 4,851,505 | 7/1989 | Hayes . |
| 4,861,855 | 8/1989 | Bockrath et al. . |
| 4,861,882 | 8/1989 | Hergenrother et al. . |
| 4,861,915 | 8/1989 | Clendinning et al. . |
| 4,861,924 | 8/1989 | Riggs . |
| 4,868,270 | 9/1989 | Lubowitz et al. . |
| 4,871,475 | 10/1989 | Lubowitz et al. . |
| 4,874,834 | 10/1989 | Higashi et al. . |
| 4,876,325 | 10/1989 | Olson et al. . |
| 4,876,328 | 10/1989 | Lubowitz et al. . |
| 4,876,330 | 10/1989 | Higashi et al. . |
| 4,891,167 | 1/1990 | Clendinning et al. . |
| 4,891,408 | 1/1990 | Newman-Evans . |
| 4,891,460 | 1/1990 | Ishii . |
| 4,895,892 | 1/1990 | Satake et al. . |
| 4,895,924 | 1/1990 | Satake et al. . |
| 4,897,527 | 1/1990 | Cripps et al. . |
| 4,902,335 | 2/1990 | Kume et al. . |
| 4,902,440 | 2/1990 | Takeyama et al. . |
| 4,902,769 | 2/1990 | Cassidy et al. . |
| 4,902,773 | 2/1990 | Bodnar et al. . |
| 4,916,210 | 4/1990 | Jackson . |
| 4,916,235 | 4/1990 | Tan et al. . |
| 4,919,992 | 4/1990 | Blundell et al. . |
| 4,923,752 | 5/1990 | Cornelia . |
| 4,927,899 | 5/1990 | Michaud et al. . |
| 4,927,900 | 5/1990 | Michaud et al. . |
| 4,931,531 | 6/1990 | Tamai et al. . |
| 4,931,540 | 6/1990 | Mueller et al. . |
| 4,935,523 | 6/1990 | Lubowitz et al. . |
| 4,958,031 | 9/1990 | Sheppard et al. . |
| 4,963,645 | 10/1990 | Inoue et al. ......................... 528/353 X |
| 4,965,336 | 10/1990 | Lubowitz et al. . |
| 4,973,662 | 11/1990 | Odagiri et al. . |
| 4,980,481 | 12/1990 | Lubowitz et al. . |
| 4,981,922 | 1/1991 | Sheppard et al. . |
| 4,985,568 | 1/1991 | Lubowitz et al. . |
| 4,990,624 | 2/1991 | Sheppard et al. . |
| 4,996,101 | 2/1991 | Landis et al. . |
| 5,003,035 | 3/1991 | Tsai et al. . |
| 5,011,905 | 4/1991 | Lubowitz et al. . |
| 5,066,028 | 11/1991 | Hino . |
| 5,066,541 | 11/1991 | Lubowitz et al. . |
| 5,066,771 | 11/1991 | Hino et al. .............................. 528/353 |
| 5,066,776 | 11/1991 | Russeler et al. . |
| 5,071,941 | 12/1991 | Lubowitz et al. . |
| 5,075,537 | 12/1991 | Lorenzen et al. . |
| 5,082,905 | 1/1992 | Lubowitz et al. . |
| 5,086,154 | 2/1992 | Camberlin et al. . |
| 5,087,701 | 2/1992 | Lubowitz et al. . |
| 5,104,967 | 4/1992 | Sheppard et al. ....................... 528/322 |
| 5,109,105 | 4/1992 | Lubowitz et al. ...................... 528/322 |
| 5,111,026 | 5/1992 | Ma . |
| 5,112,936 | 5/1992 | Okamoto . |
| 5,112,939 | 5/1992 | Lubowitz et al. . |
| 5,115,087 | 5/1992 | Sheppard et al. . |
| 5,116,935 | 5/1992 | Lubowitz et al. ...................... 528/173 |
| 5,120,819 | 6/1992 | Lubowitz et al. . |
| 5,126,410 | 6/1992 | Lubowitz et al. . |
| 5,138,028 | 8/1992 | Paul et al. . |
| 5,144,000 | 9/1992 | Sheppard et al. . |
| 5,151,487 | 9/1992 | Lubowitz et al. . |
| 5,155,206 | 10/1992 | Lubowitz et al. . |
| 5,159,055 | 10/1992 | Sheppard et al. . |
| 5,175,233 | 12/1992 | Lubowitz et al. . |
| 5,175,234 | 12/1992 | Lubowitz et al. ...................... 528/173 |
| 5,175,304 | 12/1992 | Sheppard . |
| 5,198,526 | 3/1993 | Lubowitz et al. . |
| 5,210,213 | 5/1993 | Sheppard et al. . |

| | | |
|---|---|---|
| 5,216,117 | 6/1993 | Sheppard et al. . |
| 5,227,461 | 7/1993 | Lubowitz et al. . |
| 5,230,956 | 7/1993 | Cole et al. . |
| 5,239,046 | 8/1993 | Lubowitz et al. . |
| 5,254,605 | 10/1993 | Kim et al. . |
| 5,268,519 | 12/1993 | Sheppard et al. . |
| 5,286,811 | 2/1994 | Lubowitz et al. . |
| 5,290,908 | 3/1994 | D'Alelio ................................. 528/353 |
| 5,338,532 | 8/1994 | Tomalia et al. . |
| 5,344,894 | 9/1994 | Lubowitz . |
| 5,412,066 | 5/1995 | Hergenrother et al. ................ 528/353 |
| 5,493,002 | 2/1996 | McGrath et al. . |
| 5,506,060 | 4/1996 | Lubowitz et al. . |
| 5,567,800 | 10/1996 | Hergenrother et al. ................ 528/353 |
| 5,610,317 | 3/1997 | Lubowitz et al. . |
| 5,654,396 | 8/1997 | Lubowitz et al. ..................... 528/353 |

FOREIGN PATENT DOCUMENTS

| | | |
|---|---|---|
| 2166209 | 8/1973 | France . |
| 2210635 | 7/1974 | France . |
| 2272119 | 12/1975 | France . |
| 2303818 | 10/1976 | France . |
| 1951632 | 5/1971 | Germany . |
| 1453625 | 12/1973 | Japan . |
| 58059-219 | 10/1981 | Japan . |
| 57-10011-1 | 10/1982 | Japan . |
| 1210-408-A | 2/1988 | Japan . |
| 907105 | 10/1962 | United Kingdom . |
| 1069061 | 5/1967 | United Kingdom . |
| 1099096 | 1/1968 | United Kingdom . |
| 1453625 | 10/1976 | United Kingdom . |
| 2002378 | 2/1977 | United Kingdom . |
| 2002378 | 3/1982 | United Kingdom . |
| 81/01855 | 7/1981 | WIPO . |
| 84/04313 | 11/1984 | WIPO . |

OTHER PUBLICATIONS

Patel et al., *Poly–Schiff Bases, I. Preparation of Poly–Schiff Bases from 4,4'–Diacetyl Diphenyl Ether (DDE) with Various Diamines* J. of Polymer Sci: Polymer Chem. Ed., vol. 20, 1985–1992 1982.

Walton, *A New Conjugated Network Polymer as an Electrical Conductor and Thermally Stable Plastic* Am. Chem., Soc. Org. Coat Plast. Chem., vol. 42, 595–599 1980.

Lubowitz et al., *Novel High Temperature Matrix Materials* 1986.

Serafini et al., *Thermally Stable Polyimides from Solutions of Monomeric Reactants* Journal of Applied Polymer Science, vol. 16, pp. 905–915 1972.

Spillman et al., *Copolymers of Poly(Para–Phenylene Terephthalamide) Containing a Thermally Activated Cross–Linking Agent* PMSE vol. 68, Spring Meetings 139–140 1993.

Radlmann, et al., *New Synthesis of Poly(ether Ketones).* (44195h) Chem. Abstracts vol. 72, 1970, p. 44187 1970.

Bryant, et al., *Synthesis and Properties of Phenylethynyl–Terminated Polyimides* Polymer PrePrints, vol. 34, No. 1, 566–567 Mar. 1993.

Crivello et al., *Polyimidothioether–Polysulfide Block Polymers* Polymer Sci., Polymer Chem. Ed., vol. 13, pp. 1819–1842 1975.

Frazer, *High Temperature Resistant Polymers* Interscience Publishers, John Wiley & Sons, Inc., 139–213 1968.

Mittal (ed), *Polyimides* Plenum Press, NY, vol. 1 & 2 (selected pages) 1984.

St. Clair et al., *The Development of Aerospace Polyimide Adhesives* Mittal (ed), Polyimides—Synthesis Characterization and Applications, Plenum Press, NY, vol. 2, pp. 977–1041 1973.

Serafini, et al., *A Review of Processable High Temperature Resistant Addition–type Laminating Resins* Mittal (ed), Polyimides—Synthesis, Characterization and Applications, Plenum Press, NY, vol. 1, pp. 89–95 1973.

Stenson, *Polycyanurates Find Applications; Their Chemistry Remains Puzzling* Science/Technology, 208 ACS National Meeting, Washington, D.C., C&EN Northeast News Bureau 30–31 Sep. 1994.

Sutter, et al,. *Easily Processable High–Temperature Polyimide* NASA Tech. Briefs (two pages).

Stoakley, et al., *Low–Dielectric–Constant Polyimide/Glass Composites* NASA Tech. Briefs p. 24 Apr. 1994.

Bartolotta, *Predicting Fatigue Lives of Metal–Matrix/Fiber Composites* NASA Tech Briefs pp. 28, 30 Apr. 1994.

Vannucci, et al., *Improved PMR Polyimides for Heat–Stable Laminates* NASA Tech Briefs pp. 30–31. Apr. 1994.

Bryant, et al., *Phenylethynyl End–Capping Reagents and Reactive Diluents* NASA Tech Briefs pp. 36–37 Apr. 1994.

Jensen, et al., *Phenylethynyl–Terminated Ploy(Arylene Ethers)* NASA Tech Briefs p. 37 Apr. 1994.

Buckley, et al., *Processable Polyimides for High Temperature Applications* 36th International SAMPE Symposium pp. 1172–1181 Apr. 1991.

Edwards, et al. *Constituents of the Higher Fungi. Part XIII.*[1] *2–Arly–3–methoxymaleic Anhydrides from Pulvinic Acid Derivatives. A Convenient Method for Determination of Structure of Fungaland Lichen Pulvinic Acid Derivatives* Journal of The Chemical Society pp. 1538–1542 1973.

Morrison, et al., *"Reactions"* and *Hofmann degradation of amides* Organic Chemistry Second Edition pp. 591 and 735 1966.

Kwiatkowski, et al., *Thermosetting Diphenyl Sulfone–Based Maleimides* Journal of Polymer Science, vol. 13, pp. 961–972 1975.

Lyle, et al., *Polyarylene Ethers: Maleimides, Nadimides and Blends* The Interdisciplinary Symposium on Recent Advances in Polyimides and Other High Performance Polymers, San Diego, California pp. K–1–K–7 Jan. 1990.

Roberts, et al., *Effect of Solution Concentration and Aging Conditions on PMR–15 Resin* SAMPE Journal, pp. 24–28, 213 Mar./Apr. 1986.

Southcott, et al., *"The Development of Processable, Fully Imidized, Polyimides for High–Temperature Applications"* High Perform. Polym. 6, pp. 1–12, Printed in UK 1994.

Stoessel, et al., *"High Performance Composites from Polyimide Matrix Resins that Utilize a Cross Linking Reaction of Biphenylene End–Caps with Acetylene Units in the Mail Chain"* Journal of Applied Science, vol. 36, pp. 1847–1864 1988.

T. Takeichi, et al., *"Star and Linear Imide Oligomers Containing Reactive End Caps: Preparation and Thermal Properties"* Macromolecules vol. 19, No. 8 ©1986 American Chemical Society Aug. 1986.

T. Takeichi, et al., *"Biphenylene End–Capped Imide Oligomers Having Internal Acetylene Groups in The Backbone: Preparation and Thermal Properties"* Macromolecules 1986, vol. 19, pp. 2103–2108 1986 ©1986 American Chemical Society.

Vinogradova et al., *"Polyarylates of Phenolphthalein Containing Small Amount of Phloroglucinol"* Ser. A (1967) 9(8), 1797–1801 CODEN: VYSAAF Russian Journal.

Harris, et. al. "Synthesis and Characterization of Reactive End–Capped Polyimide Oligomers" Poly. Prepr. 24(2) pp. 324–325 Aug. 8 (1983).

Synthesis and Characterization of Reactive End–Capped Polyimide Oligomers Poly. Prepr. 24(2) pp. 324–325 Aug. 8 (1983).

PHENYLETHYNYL CAPPED IMIDES

REFERENCE TO RELATED APPLICATIONS

This application is a divisional application based upon U.S. patent application Ser. No. 08/477,560, filed Jun. 7, 1995, which was a continuation of U.S. Ser. No. 07/619,677 filed Nov. 29, 1990 and now U.S. Pat. No. 5,645,925, which was a continuation of U.S. Ser. No. 07/167,604 filed Mar. 14, 1988, now abandoned.

TECHNICAL FIELD

The present invention relates to polymeric blends comprising crosslinking oligomer(s) and polymer(s) wherein the backbones of the oligomer(s) and polymer(s) are from different chemical families.

BACKGROUND OF THE INVENTION

Recently, chemists have sought to synthesize oligomers for high performance advanced composites suitable for aerospace applications. These composites should exhibit solvent resistance; be tough, impact resistant, and strong; be easy to process; and be thermoplastic. Oligomers and composites that have thermo-oxidative stability and, accordingly, can be used at elevated temperatures are particularly desirable.

While epoxy-based composites are suitable for many applications, their brittle nature and susceptibility to thermal and hydrolytic degradation make them inadequate for many aerospace applications, especially those applications which require thermally stable, tough composites or service in harsh conditions. Accordingly, research has recently focused on polyimide composites to achieve an acceptable balance between thermal or hydrolytic stability, solvent resistance, and toughness. Still the maximum temperatures for use of the polyimide composites, such as PMR-15, are about 600°–625° F., since they have glass transition temperatures of about 690° F. PMR-15 also suffers from brittleness.

There has been a progression of polyimide sulfone compounds synthesized to provide unique properties or combinations of properties. For example, Kwiatkowski and Brode synthesized maleic-capped linear polyarylimides as disclosed in U.S. Pat. No. 3,839,287. Holub and Evans synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "star-burst" multidimensional oligomers. We have shown surprisingly high glass transition temperatures yet reasonable processing and desirable physical properties in many of these oligomers and their composites.

Polybenzoxazoles, such as those disclosed in our U.S. Pat. Nos. 4,965,336 (to Lubowitz & Sheppard) and 4,868,270 (to Lubowitz, Sheppard, and Stephenson), may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in U.S. Pat. No. 5,210,213, are easier to process than some advanced composite oligomers since they can be handled at lower temperatures. Upon curing, however, the oligomers chemically crosslink through their end caps in addition polymerization so that the thermal resistance of the resulting composite is markedly increased with only a minor loss of stiffness, matrix stress transfer (impact resistance), toughness, elasticity, and other mechanical properties. Glass transition temperatures above 95° F. are achievable.

Commercial polyesters, when combined with well-known diluents, such as styrene, do not exhibit satisfactory thermal and oxidative resistance to be useful for aircraft or aerospace applications. Polyarylesters (i.e., arylates) are often unsatisfactory, also, since the resins often are semicrystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end capped polyester imide ether sulfone oligomers that have an acceptable combination of solvent resistance, toughness, impact resistance, strength, ease of processing, formability, and thermal resistance. By including Schiff base (—CH=N—), imidazole, thiazole, or oxazole linkages in the oligomer chain, the linear, advanced composites formed with polyester oligomers of our copending application U.S. Ser. No. 07/137,493, now U.S. Pat. No. 5,705,598, can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications (including U.S. Ser. No. 07/212,404 to Lubowitz, Sheppard, and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e. an end cap having one or two crosslinking functionalities) to allow controlled crosslinking upon heat-induced or chemically-induced curing. Other "semiconductive" oligomers are described in our other copending applications.

Polyamide oligomers and blends are described in our U.S. Pat. Nos. 4,935,523; 4,847,333; and 4,876,328, and polyetherimide oligomers and blends are described in our U.S. Pat. No. 4,851,495.

Polyamideimides are generally injection-moldable, amorphous, engineering thermoplastics which absorb water (swell) when subjected to humid environments or immersed in water. Polyamideimides are generally described in the following patents: U.S. Pat. No. 3,658,938; U.S. Pat. Nos. 4,628,079; 4,599,383; 4,574,144; or 3,988,344. The thermal integrity and solvent-resistance can be greatly enhanced by capping amideimide backbones with monomers that present one or two crosslinking functionalities at each end of the oligomer, as described in U.S. Pat. No. 5,104,967.

Blends of these oligomers are described in many of our earlier applications and comprising a mixture of an oligomer and a compatible polymer, generally of the same family, of substantially the same backbone. The polymer is formed by an analogous condensation generally substituting a non-crosslinking end-cap monomer (such as phenol, benzoic acid chloride, or aniline) for the crosslinking end cap used in the oligomers.

Interpenetrating or semi-interpenetrating networks are also known, such as those described by Egli et al. in "Semi-Interpenetrating Networks of LARC-TPI" available from NASA-Langley Research Center.

Mixed polymer blends, such as an amideimide/phenoxyphenylsulfone blend, are described in U.S. Pat. No. 3,658,939.

SUMMARY OF THE INVENTION

Blends present promise for tailoring the mechanical properties of composites while retaining ease of processing. The present invention comprises advanced composite blends that are mixed chemical blends of a linear or multi-dimensional crosslinking oligomer(s) of one chemical family, such as a heterocycle, and corresponding linear or multidimensional polymer(s), unable to crosslink, from a different chemical family, such as ethersulfone. Generally the polymer has an average formula weight that is initially higher than that of the oligomer, but the formula weight of the oligomeric portion of the blend will increase appreciably during curing through addition (i.e. homo-) polymerization between the crosslinking functionalities. The ratio of oligomer(s) to polymer(s) can be varied to achieve the desired combination of physical properties. Usually the ratio is such that the addition polymer formed during curing constitutes no more than about 50 mol % of the composite.

While two component blends are preferred, the blends can be more complex mixtures of oligomers or polymers with coreactants, if desired. The blends may even include coreactive oligomers as will be explained.

The linear oligomers generally have the formula:

wherein i=1 or 2;

A=an aromatic, aliphatic, or aromatic/aliphatic hydrocarbon backbone;

Y=an unsaturated hydrocarbon residue including a segment selected from the group consisting of:

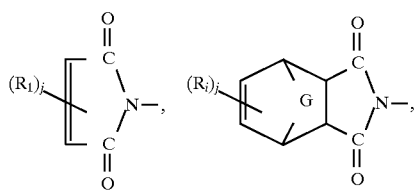

-continued

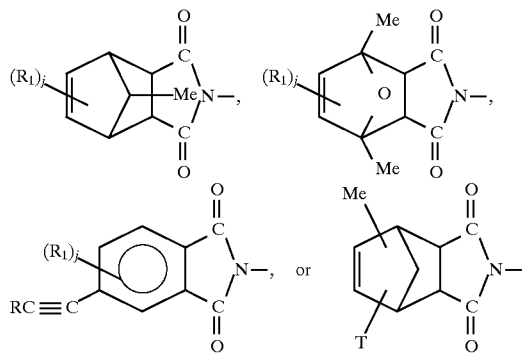

$R_1$=lower alkyl, aryl, substituted alkyl, substituted aryl (including hydroxyl or halo-substituents), lower alkoxy, aryloxy, halogen, or mixtures thereof (preferably lower alkyl);

G=—SO$_2$—, —S—, —O—, —CH$_2$—, —CO—, —SO—, —CHR—, or —CR$_2$— (preferably —O— or —CH$_2$—);

j=0, 1, or 2;

T=methallyl or allyl;

R=hydrogen, lower alkyl, or phenyl; and

Me=methyl.

The backbone (A) is preferably selected from imidesulfone; ethersulfone; amide; imide; ether; ester; estersulfone; etherimide; amideimide; oxazole, thiazole, imidazole (i.e. heterocycles); or heterocycle sufone.

In coreactive oligomer blends, Y preferably is selected from the group consisting of:

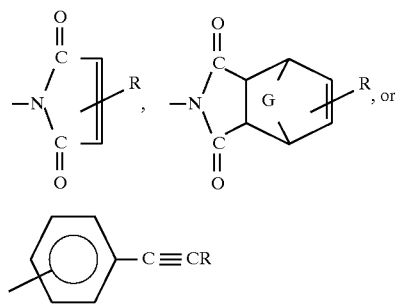

wherein

G=—CH$_2$—, —SO$_2$—, —S—, —O—, or —CO—, and

R=hydrogen, lower alkyl, or phenyl, and the blend includes a second (coreactive) oligomer of the general formula:

wherein i=1 or 2;

B=a hydrocarbon backbone that is the same or different from A;

Z=a hydrocarbon residue including a segment selected from the group consisting of:

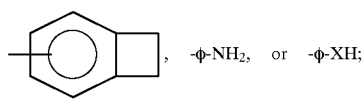, -φ-NH₂, or -φ-XH;

Φ=phenyl; and
X=—O— or —S—.

Generally, the hydrocarbons (A or B) in these coreactive oligomer blends are entirely aromatic with phenyl radicals between the linkages, although aliphatic radicals can be used.

The coreactive oligomer blends, which can be cured to form block copolymers, comprise any ratio of the coreactive oligomers. Changing the ratio changes the physical properties in the final composites. Curing the coreactive oligomers involves mutual (interlinking) polymerization and addition polymerization. Therefore, generally equimolar mixtures are used in the blends.

The individual oligomers should initially have relatively low average formula weights and, accordingly, should remain relatively easy to process until the curing reaction when the extended chain and block copolymers are formed to produce the composite. A complex mixture of at least three types of addition polymer are formed upon curing.

In the present invention, the oligomers or the coreactive oligomer blends are further blended with a noncrosslinking polymer having a backbone from a different chemical family. The polymer can be from any one of the families described for the oligomers, but the oligomeric and polymeric backbones must be different to form what we elect to call an advanced composite (i.e. mixed chemical) blend. The resulting blend may yield IPN or semi-IPN morphology in the consolidated resin (composite) state.

Preferably the polymer has an average formula weight initially greater than that of the oligomer, because the formula weight of the oligomer in the cured composite will increase through addition polymerization. The cured composite will have a blend of two, "long" molecules, and will not suffer from a broad distribution of formula weights that reduce the physical properties obtainable in some prior art blends, such as suggested by Kwiatkowski in U.S. Pat. No. 3,658,939.

Preferred oligomer/polymer combinations in the advanced composites blends of the present invention include:
amideimide/imide;
amideimide/heterocycle;
amideimide/heterocycle sulfone;
imide/heterocycle;
imide/heterocycle sulfone;
imide/amide;
ester/amide; and
ester/imide.

Multidimensional oligomers have an aromatic hub and three or more chains or arms radiating from the hub. The chains include backbones similar to those for the linear oligomers and are capped with the crosslinking end cap monomers previously described. Corresponding polymers are quenched with noncrosslinking radicals, as will be described. These oligomers can also be used to form advanced composite blends.

BEST MODE CONTEMPLATED FOR MAKING AND USING THE INVENTION

Advanced composite (mixed chemical) blends of the present invention comprise a mixture of a crosslinking oligomer from one chemical family, generally selected from the group consisting of:
imidesulfone;
ether;
ethersulfone;
amide;
imide;
ester;
estersulfone;
etherimide;
amideimide;
oxazole;
oxazole sulfone;
thiazole;
thiazole sulfone;
imidazole; and
imidazole sulfone,
and a noncrosslinking polymer from a different chemical family. Coreactants may be included in the blends, or they may comprise mixtures of three or more oligomers/polymers, as will be explained. Because the oligomer's average formula weight will appreciably increase upon curing, generally the average formula weight of the polymer in the uncured blend will be greater than that of the oligomer. For example, a linear oligomer may have an average formula weight of about 500–5000 while the corresponding polymer has an average formula weight of about 20,000–40,000. Upon curing, the oligomer and polymer will generally have average formula weights that are closer because of addition polymerization of the oligomer. Therefore, the problems sometimes encountered with blends having components of widely different average formula weight are not as pronounced in composites formed from the advanced composite blends of the present invention.

Advanced composite blends allow tailoring of the properties of high performance composites. They allow averaging of the properties of resins from different families to provide composites that do not have as severe shortcomings as the pure compounds. For example, the rigid nature of heterocycles (oxazole, thiazole, or imidazole) can be reduced by an advanced composite blend comprising a heterocycle oligomer and an ethersulfone polymer. The resulting composite will have a use temperature (thermooxidative stability) higher than pure ethersulfone and a flexibility greater than the pure heterocycle. Accordingly, the resulting composites have a blending or averaging of physical properties, which makes them candidates for particularly harsh conditions.

Particularly preferred oligomer/polymer combinations include:
amideimide/imide;
amideimide/imidesulfone;
amideimide/heterocycle;
amideimide/heterocycle sulfone;
imide/heterocycle;
imidesulfone/heterocycle;
imide/heterocycle sulfone;
imide/amide;
imidesulfone/amide;
ester/amide;
estersulfone/amide;
ester/imide;

ester/imidesulfone;
estersulfone/imide; or estersulfone/imidesulfone.

In each case the oligomer can be either component in the mixture.

Linear oligomers have the general formula:

wherein
  i=1 or 2;
  A=a hydrocarbon residue, preferably from one of the families previously described and having an aromatic, aliphatic, or aromatic and aliphatic backbone; and
  D=an unsaturated hydrocarbon radical that is suitable for crosslinking.

The oligomeric component may itself be a coreactive oligomer blend rather than a single oligomeric component. That is, the oligomer may include two precursors that polymerize to form block copolymers upon curing through mutually reactive end caps on the respective precursors. The resulting composites include a mix of addition polymers created by crosslinking chain extension and block copolymers formed through a resin interlinking reaction. The coreactive oligomer blends generally include at least one oligomer of the general formula:

wherein D preferably is selected from the group consisting of:

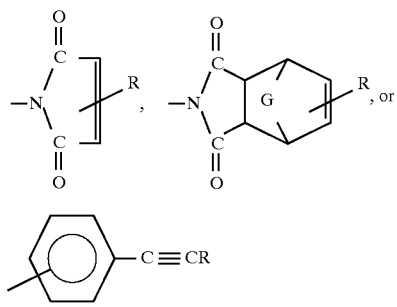

G=—SO$_2$—, —S—, —O—, —CO—, or —CH$_2$—; and
R=hydrogen, lower alkyl, or phenyl and another oligomer of the general formula:

wherein
  i=1 or 2;
  B=a hydrocarbon backbone that is in the same or from a different chemical family as A; and
  Z=a hydrocarbon residue including an end cap radical selected from the group consisting of:

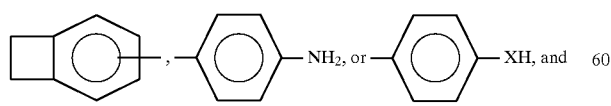

X=—O— or —S—.

The backbones (A or B) in this circumstance, as with the pure component oligomers, are generally individually selected from the group consisting of:

imidesulfones;
ethersulfones;
amides;
ethers;
esters;
estersulfones;
imides;
etherimides;
amideimides;
oxazoles;
thiazoles;
imidazoles, or
heterocycle (i.e. oxazole, thiazole imidazole) sulfones;

and generally include only aromatic (typically phenyl) radicals between linkages, although they may have other aromatic, aliphatic, or aromatic and aliphatic radicals. Although this description will primarily describe para isomers of these backbones, other isomers (particularly meta) can be used. The aromatic radicals in the backbones may also include nonreactive substituents in some cases, such as aryl, lower alkyl, or lower alkoxy.

Oligomers of the general formula: D$_i$—A—D$_i$ or Z$_i$—B—Z$_i$ are prepared by reacting suitable end cap monomers with the monomer reactants (polymer precursors) that are commonly used to form the desired backbones. For example, an imide or an imidesulfone is prepared by reacting an end cap monomer with a diamine with a dianhydride in accordance with the method described in U.S. Pat. No. 4,584,364. Ethersulfones or ethers can be prepared on reacting an end cap monomer with a suitable dialcohol (i.e. diol, bisphenol, or dihydric phenol) with a dihalogen as described in U. S. Pat. No. 4,414,269 or other ether condensation reactions.

The crosslinking end cap monomers are readily prepared by the condensation of the corresponding anhydride and a suitable amine, as described in U.S. Pat. No. 4,604,437 with respect to the allyl-substituted or methallyl-substituted methylbicyclo[2.2.1]hept-5-ene-2,3-dicarboximides.

For the coreactive oligomers, the end cap monomers generally are selected from the group consisting of:

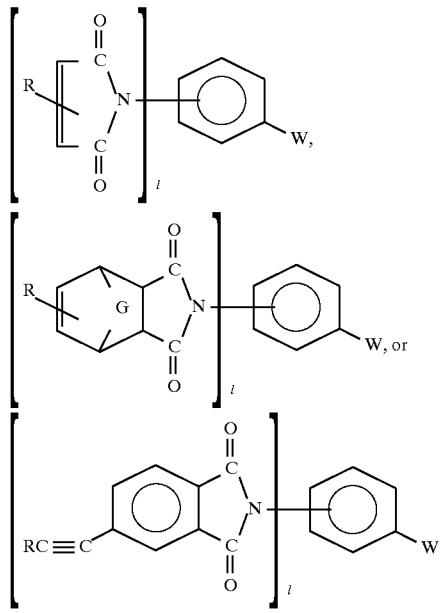

wherein i=1 or 2;

G=—SO$_2$—, —S—, —O—, —CO—, —CH$_2$—, —SO—, —CHR—, or —CR$_2$—;

R=hydrogen, lower alkyl, or phenyl;

W=—OH, —NH$_2$, or —COX; and

X=halogen.

Similarly, the end cap monomers for the $Z_i$—B—$Z_i$ oligomers generally are selected from the group consisting of aminophenol, aminobenzoic acid halide, H$_2$N—Φ—SH,

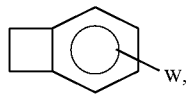

or the like, wherein φ=phenyl and W=—OH, —NH$_2$, or —COX.

Upon curing, the oligomers in coreactive oligomer blends addition polymerize by crosslinking and form block copolymers through the Michaels addition reaction between the hydrocarbon unsaturation of one oligomer and the amine, hydroxyl, or sulfhydryl group of the other. The reaction of the hydrocarbon unsaturation of one oligomer with the

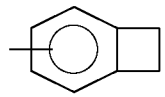

functionality of the other follows the mechanism described in U.S. Pat. No. 4,719,283 to form a cyclohexane linkage by bridging across the double bond. With the acetylene (triple) unsaturation, a cyclohexene linkage would result.

The Michaels addition reaction is illustrated as follows:

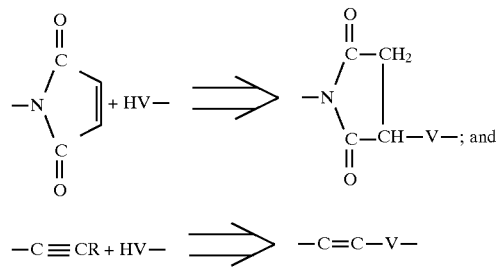

wherein V=—NH—, —O—, or —S—. For the other end caps, we believe a reverse Diels-Alder decomposition reaction (induced by heating the oligomers) results in the formation of a reactive maleic moiety and the off-gassing of a cyclopentadiene. The methylene bridge decomposes to the maleic compound at about 625°–670° F. (330°–355° C.) while the —O— bridge decomposes at the lower temperature of about 450° F. (230° C.).

The reactive group might also be —CNO instead of the amine, but we do not recommend use of this compound.

Thus, the linear oligomers in the present invention have the general formula: $D_i$—A—$D_i$; wherein A and i are as previously defined and

D =

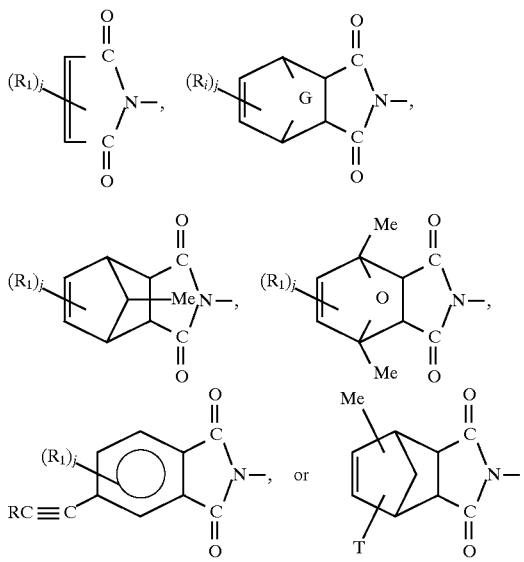

$R_1$=lower alkyl, aryl, substituted alkyl or substituted aryl (including hydroxyl or halo-substituents), lower alkoxy, aryloxy, halogen, or mixtures thereof (preferably lower alkyl)

G=—O—, —S—, —SO$_2$—, —CH$_2$—, —CO—, —SO—, —CHR—, or —CR$_2$—;

i=1 or 2;

j=0, 1, or 2;

T=methallyl or allyl;

Me=methyl; and

R=hydrogen, lower alkyl, or phenyl.

All reactions used in the preparation of the oligomers should be carried out in suitable solvents and under an inert atmosphere. To prepare imide or imidesulfones, then, of the general formula $D_i$—A—$D_i$ or $Z_i$—B'$Z_i$, the respective amine end cap preferably is mixed with a diamine and a dianhydride. To prepare ethers or ethersulfones, the respective hydroxy (i.e., phenol) end cap is mixed with suitable dialcohols (i.e., diols) and dihalogens or dinitrohydrocarbons. To prepare amides, the respective amide or acid halide end cap is mixed with suitable dicarboxylic acid halides and diamines. To prepare esters or estersulfones, the respective hydroxy or acid halide end cap is mixed with suitable dialcohols and dicarboxylic acid halides.

To prepare etherimides, the respective amine end caps are reacted with:

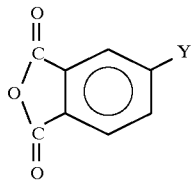

wherein Y=nitro- or halo- (i.e. nitrophthalic anhydride or halophthalic anhydride) to form an imide while leaving an active nitro- or halo-functionality. This intermediate is then mixed with suitable nitro/anhydrides and compounds of the formula: H₂N—R—XH, as suggested in our U.S. Pat. Nos. 3,847,869, 4,107,147 or 4,851,495.

To prepare amideimides, the method of U.S. Ser. No. 07/092,740, now abandoned, is used, which comprises condensing simultaneously an amine or acid halide end cap with suitable dicarboxylic acid halides (i.e. dibasic acid halides) and diamines, wherein either or both of the diamines or diacid halides include intermediate imide linkages. Alternatively, the amideimides can be prepared by condensing the respective amine end cap with suitable dianhydrides and diamines, wherein either or both of the dianhydrides or diamines include amide linkages.

Heterocycle or heterocycle sulfone oligomers (i.e. oxazole, thiazoles, or imidazoles) are prepared by condensing acid halide end caps with four-functional compounds, like diaminodihydroxybenzene, and dicarboxylic acid halides (or the acids).

The synthesis of these oligomers and the representative classes of reactants will now be presented in greater detail to illustrate the scope of the invention and to describe the nature of the preferred reactants.

Amideimides are characterized by backbones of two general types, namely:

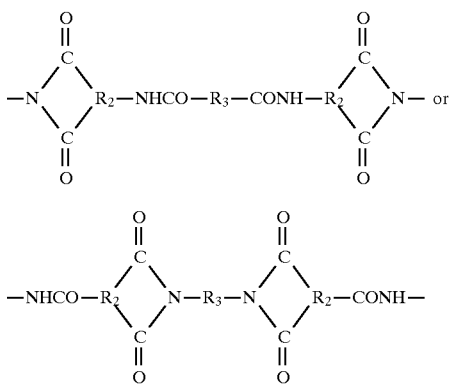

wherein $R_3$=an aromatic, aliphatic, or alicyclic radical, and preferably a phenoxyphenyl sulfone; and $R_2$=a trivalent organic radical, and preferably phenyl.

Accordingly, linear polyamideimides include oligomers of the general formula:

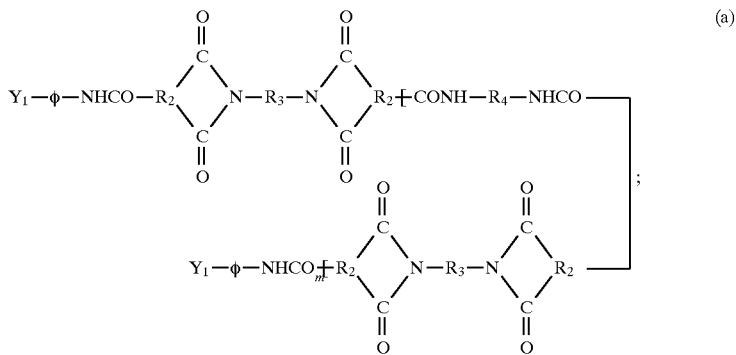

(a)

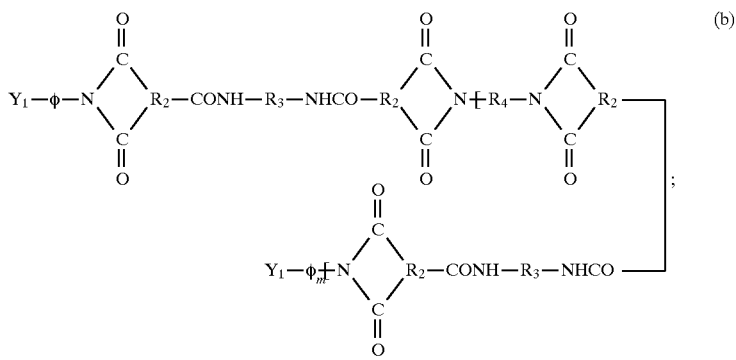

(b)

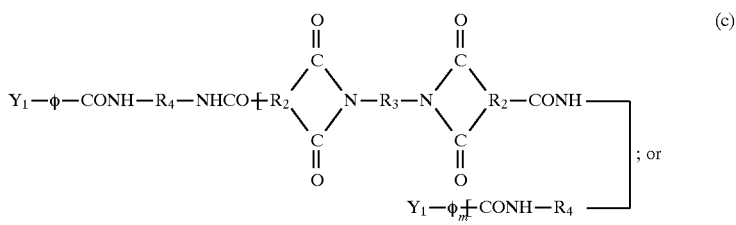

(c)

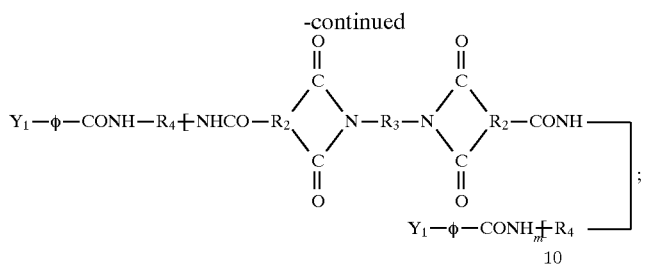

(d)

wherein
- Y=an end cap residue of either type;
- $R_2$=a trivalent organic radical, and preferably phenyl;
- $R_3$=an aromatic, aliphatic, or alicyclic radical, and preferably a phenoxyphenyl sulfone.
- $R_4$=a divalent organic radical;
- m=a small integer, usually from 0–5, but generally sufficiently large to impart thermoplastic properties in the oligomer;
- φ=phenyl; and
- i=1 or 2.

The amideimides are generally made by condensing suitable end cap monomers, diacid halides, diamines, and dianhydrides. The dianhydrides can be prepared by condensing 2 moles of an acid halide anhydride of the formula:

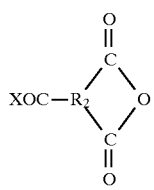

with a diamine of the formula: $H_2N-R_3-NH_2$. The diamine, in this case, can be selected from the group consisting of:

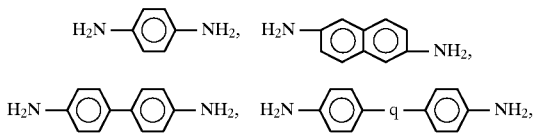

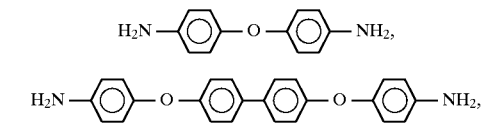

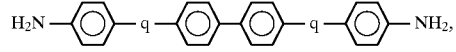

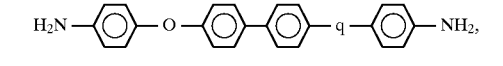

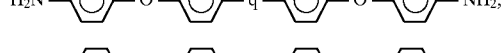

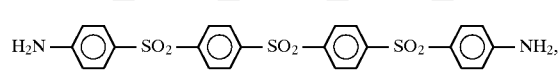

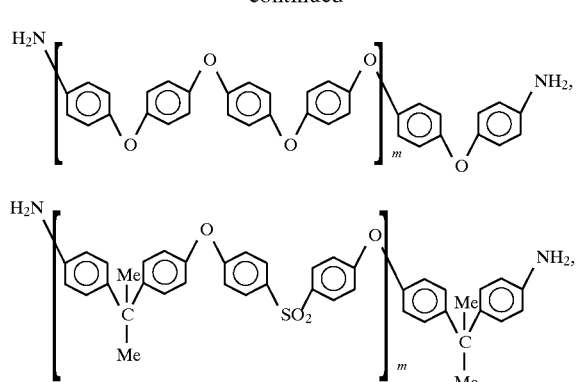

or

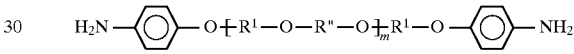

wherein $R^1$ = 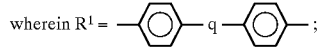;

$R''$ = 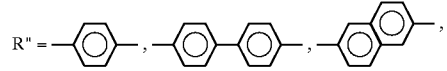

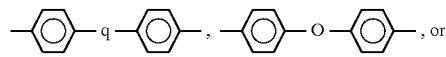, or

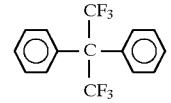

q=—$SO_2$—, —CO—, —S—, or —$(CF_3)_2C$—;
Me=methyl;
m=a small integer; and
D=—CO—, —$SO_2$—, —$(CF_3)_2C$— or mixtures thereof.

Other diamines that may be used, but that are not preferred, include those described in U.S. Pat. Nos. 4,504,632; 4,058,505; 4,576,857; 4,251,417; and 4,215,418. The aryl or polyaryl "sulfone" diamines previously described are preferred, since these diamines are soluble in conventional synthetic solvents and provide high thermal stability to the resulting oligomers and composites.

Diamines may include "Schiff base" conductive linkages (particularly —N=CH—), analogous to diacid halides which will be described.

Particularly preferred ethersulfone (i.e. phenoxyphenyl sulfone) diamines are those in which $R^1$ is

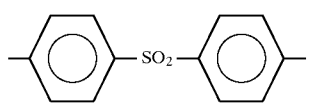

and R" is

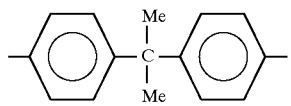

so that the phenoxyphenyl sulfone diamines include:

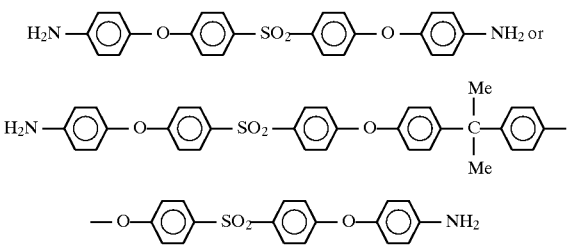

The molecular weights of these diamines varies from about 500 to about 2000. Using lower molecular weight diamines seems to enhance the mechanical properties of the difunctional polyamideimide oligomers, each of which has alternating ether "sulfone" segments in the backbone.

Phenoxyphenyl sulfone diamines of this general nature can be prepared by reacting two moles of aminophenol with (n+1) moles of an aryl radical having terminal, reactive halofunctional groups (dihalogens), such as 4,4'-dichlorodiphenylsulfone, and a suitable bisphenol (i.e., dialcohol, dihydric phenol, or diol). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane; or mixtures thereof, as disclosed in U.S. Pat. No. 3,262,914. Bisphenols having aromatic character (i.e., absence of aliphatic segments), such as bisphenol-A, are preferred.

The dihalogens in this circumstance preferably are selected from the group consisting of:

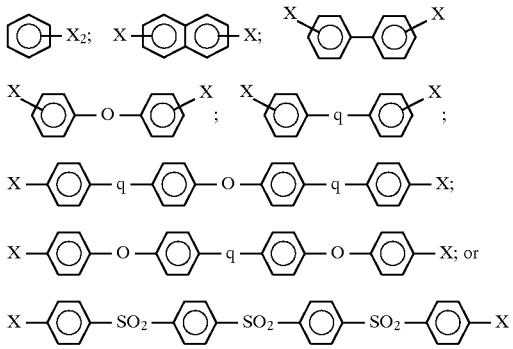

wherein

X=halogen, preferably chlorine; and q=—S—, —SO$_2$—, —CO—, —(CH$_3$)$_2$C—, and —(CF$_3$)$_2$C—, and preferably either —SO$_2$— or —CO—.

The condensation reaction creates ether diamines that ordinarily include intermediate "sulfone" linkages. The condensation generally occurs through a phenate mechanism in the presence of K$_2$CO$_3$ or another base in a DMSO/toluene solvent. The grain size of the K$_2$CO$_3$(s) should fall within the 100–250 ANSI mesh range.

Additional methods for preparing phenoxyphenysulfones of this general type are disclosed in U.S. Pat. Nos. 3,839,287 and 3,988,374.

The diacid halide or dicarboxylic acid (i.e. dibasic acid) may include an aromatic chain segment selected from the group consisting of:

(a) phenyl; (b) naphthyl; (c) biphenyl;

(d) a polyaryl "sulfone" divalent radical of the general formula:

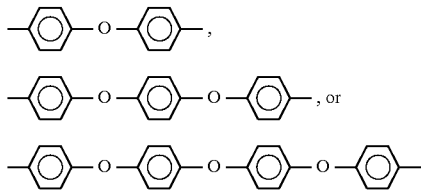

wherein D=—S—, —O—, —CO—, —SO$_2$—, —(CH$_3$)$_2$C—, —(CF$_3$)$_2$C—, or mixtures thereof throughout the chain; or (e) a divalent radical having conductive linkages, illustrated by Schiff base compounds selected from the group consisting of:

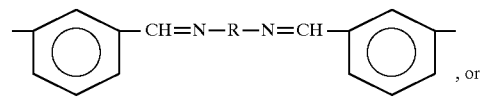

-continued

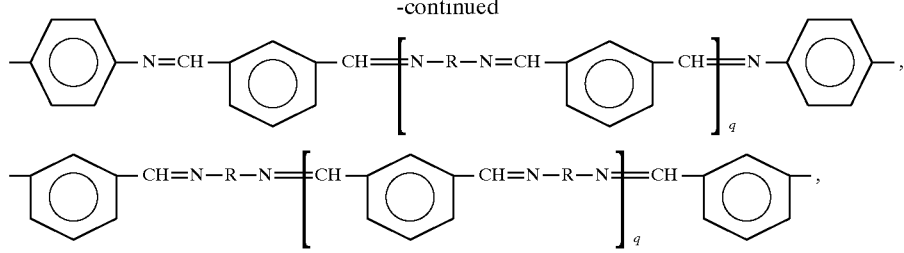

wherein R is selected from the group consisting of:
phenyl; biphenyl; naphthyl; or
a divalent radical of the general formula:

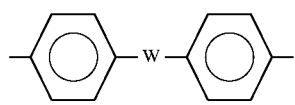

wherein
W=—SO₂— or —CH₂—; and q=0–4; or
(f) a divalent radical of the general formula:

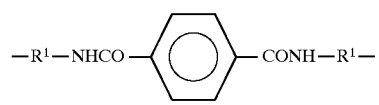

wherein
R¹=a $C_2$ to $C_{12}$ divalent aliphatic alicyclic, or aromatic radical, and, preferably, phenyl (as described in U.S. Pat. No. 4,556,697).

-continued

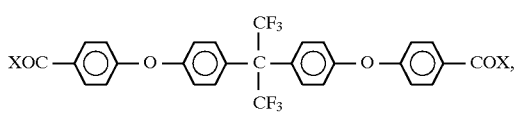

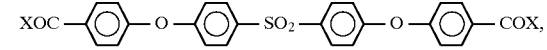

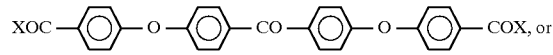

Schiff base dicarboxylic acids and diacid halides can be prepared by the condensation of aldehydes and aminobenzoic acid (or other amine acids) in the general reaction scheme:

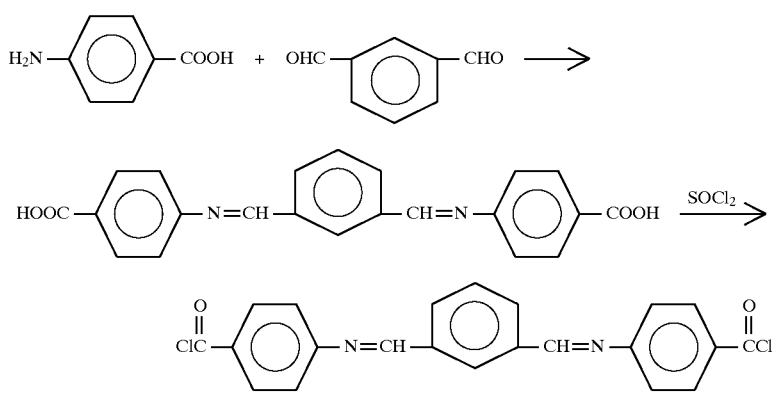

or similar syntheses.

Other diacid halides that can be used, but that are not preferred, are disclosed in U.S. Pat. No. 4,504,632, and include:
adipylchloride,
malonyl chloride,
succinyl chloride,
glutaryl chloride,
pimelic acid dichloride,
suberic acid dichloride,
azelaic acid dichloride,
sebacic acid dichloride,
dodecandioic acid dichloride,
phthaloyl chloride, Thiazole, oxazole, or imidazole linkages, especially between aryl groups, may also be used as the conductive linkages to form the conductive or semiconductive oligomers.

The preferred diacid halides include:

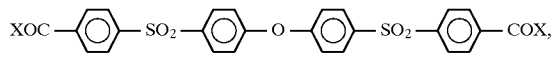

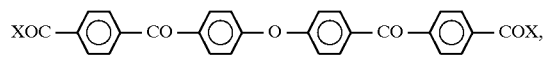

isophthaloyl chloride, terephthaloyl chloride, 1,4-naphthalene dicarboxylic acid dichloride, and 4,4'-diphenylether dicarboxylic acid dichloride.

Polyaryl or aryl diacid halides are preferred to achieve the highest thermal stabilities in the resulting oligomers and composites insofar as aliphatic bonds are not as thermally stable as aromatic bonds. Particularly preferred compounds include intermediate electronegative (i.e., "sulfone") linkages (such as —SO$_2$—, —S—, —CO—, and —(CF$_3$)$_2$C—) to improve toughness of the resulting oligomers.

The corresponding amideimide of the formula:

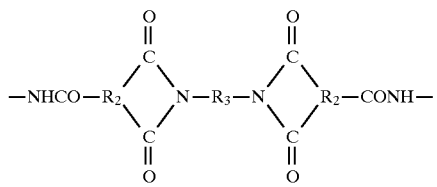

can be prepared if the acid anhydride:

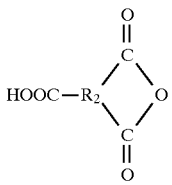

is used instead of the acid halide anhydride. The resulting intermediate products are dicarboxylic acids rather than dianhydrides. These dicarboxylic acids (or their diacid halides) can be used with the diamines previously described.

Dianhydrides useful for the synthesis of amideimides also include:

(a) pyromellitic dianhydride, (b) benzophenonetetracarboxylic dianhydride (BTDA), and (c) 5-(2,5-diketotetrahydrofuryl)-3-methylcyclohexene-1, 2-dicarboxylic anhydride (MCTC), and may be any aromatic or aliphatic dianhydride, such as those disclosed in U.S. Pat. Nos. 3,933,862; 4,504,632; 4,577,034; 4,197,397; 4,251,417; 4,251,418; or 4,251,420. Mixtures of dianhydrides might be used. Lower molecular weight dianhydrides are preferred, and MCTC or other aliphatic dianhydrides are the most preferred for the lower curing polyamideimides having caps with two crosslinking functionalities.

Of course, the dianhydrides also include those intermediates resulting from the condensation of the acid halide anhydride with any of the diamines previously described. Similarly, the dicarboxylic acids and diacid halides include those intermediates prepared by the condensation of the acid anhydride with any of the diamines previously described. The corresponding dicarboxylic acid is converted to the diacid halide (i.e. chloride) in the presence of SOCl$_2$ (i.e. thionyl chloride).

The amideimides of the present invention can be synthesized by several schemes, as previously described. To obtain repeating units of the general formula:

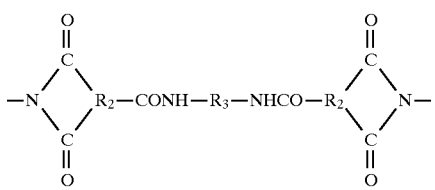

an acid halide anhydride particularly

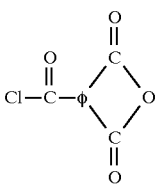

can be mixed with a diamine and with an amine end cap in the ratio of n:n:2 wherein n=an integer greater than or equal to 1. In this reaction, the acid halide anhydride will react with the diamine to form an intermediate dianhydride which will condense with the diamine and amine end cap. The reaction may be carried out in two distinct stages under which the dianhydride is first prepared by mixing substantially stoichiometric amounts (or excess diamine) of the acid halide anhydride and diamine followed by the addition of a mixture of more diamine and the end cap. Of course, the diamine used to form the dianhydride may differ from that used in the second stage of the reaction, or it may be a mixture of diamines from the outset.

The related amideimide having repeating units of the general formula:

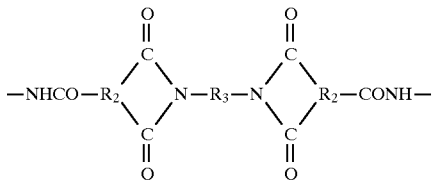

can be synthesized by reacting the acid anhydride with the diamine to form intermediate dicarboxylic acids, which can then react with more diamine or an amine end cap to complete the oligomer. Again, the reaction can be separated into steps.

The amideimide oligomers (as with all oligomers) appear to possess greater solvent resistance if the condensation of the dianhydride/dicarboxylic acid with the diamine and end cap is done simultaneously rather than sequentially.

While use of an amine end cap has been described above, corresponding oligomers can be formed by using an acid halide end cap, if the diamine is provided in excess. In this case the reaction mixture generally comprises the acid halide anhydride or the acid anhydride, the end cap, and the diamine and the synthesis is completed generally in one step.

All reactions should be conducted under an inert atmosphere and at elevated temperatures, if the reaction rate needs to be increased. The reaction mixture should be well stirred throughout the synthesis. Chilling the reaction mixture can slow the reaction rate and can assist in controlling the oligomeric product.

As suggested in U.S. Pat. No. 4,599,383, the diamine may be in the form of its derivative OCN—R—NCO, if desired.

The amideimides described in U.S. Pat. Nos. 4,599,383; 3,988,374; 4,628,079; 3,658,938; and 4,574,144 can all be capped with the crosslinking monomers to convert the polymers to oligomers that are suitable for forming advanced composite blends.

Polyetherimides and polysulfoneimides are capped to form oligomers that are suitable for use in the coreactive oligomer blends. Preferred compounds have the general formula:

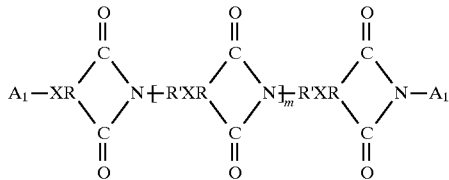

wherein

X=—O— or —S—;

$A_1 =$ 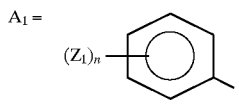

n=1 or 2;

$Z_1$=D or Z, as previously defined;

R=a trivalent $C_{(6-13)}$ aromatic organic radical; and

R=a divalent $C_{(6-30)}$ aromatic organic radical.

The polyetherimide oligomers can be prepared by several reaction schemes. One such method comprises the simultaneous condensation of:

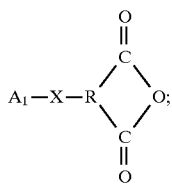 (I)

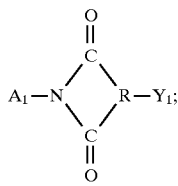 (II)

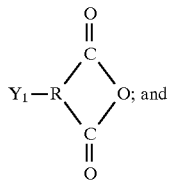 (III)

$H_2N—R'—X—H$ (IV)

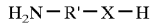

in the ratio of I:II:III:IV=1:1:m:m+1, wherein m is an integer greater than or equal to one, and $Y_1$=halo- or nitro-. The product has the general formula previously described. The reaction occurs in a suitable solvent under an inert atmosphere. If necessary, the reaction mixture can be heated to facilitate the reaction. The reaction conditions are generally comparable to those described in U.S. Pat. Nos. 3,847,869 and 4,107,147.

Alternatively, the polyetherimides can be prepared by reacting a polyetherimide polymer made by the self-condensation of a phthalimide salt of the formula:

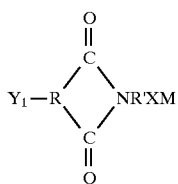

with crosslinking end cap moieties of the formulae:

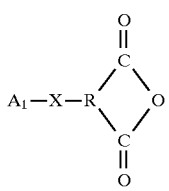

and

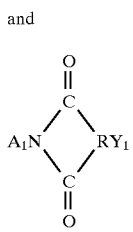

wherein

X=—O— or —S—;

$A_1 = (Z_1)_n$ 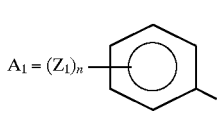

n=1 or 2;

$Z_1$=D or Z, as previously described;

$Y_1$=halo- or nitro-;

R'=a divalent $C_{(6-30)}$ aromatic organic radical, and

M=an alkali metal ion or ammonium salt or hydrogen.

The self-condensation proceeds as described in U.S. Pat. No. 4,297,474 in a dipolar aprotic solvent. The end cap moieties can be introduced during the self-condensation to quench the polymerization, or they might be added following completion of the polymerization and recovery of the polyetherimide polymer from methanol. Improved solvent resistance in the cured composites is best achieved, however, by the quenching sequence rather than by the capping sequence which follows polymerization.

Yet another preferred method for synthesizing the polyetherimides of the present invention involves the simultaneous condensation of about 2 m+2 moles of nitrophthalic anhydride with about m+1 moles of diamine, about m moles of dialcohol (i.e., bisphenol, dial, or dihydric phenol), and 2 moles of $A_1$—OH in a suitable solvent under an inert atmosphere. Here, the dialcohol may actually be in the form of a phenate.

In this reaction, the diamines (which preferably have aromatic ethersulfone backbones) react with the anhydride to form intermediates of the following nature in the backbone:

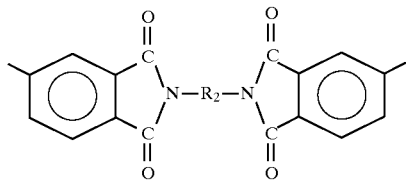

wherein $R_2$ = a residue of the diamine. Similarly, the dialcohol reacts with the nitro-functionality to form an ether linkage of the general formula:

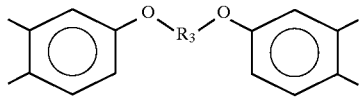

wherein $R_3$ = a residue of the dialcohol. The $A_1$—OH end caps quench the polymerization. The resulting polyetherimides have the general formula:

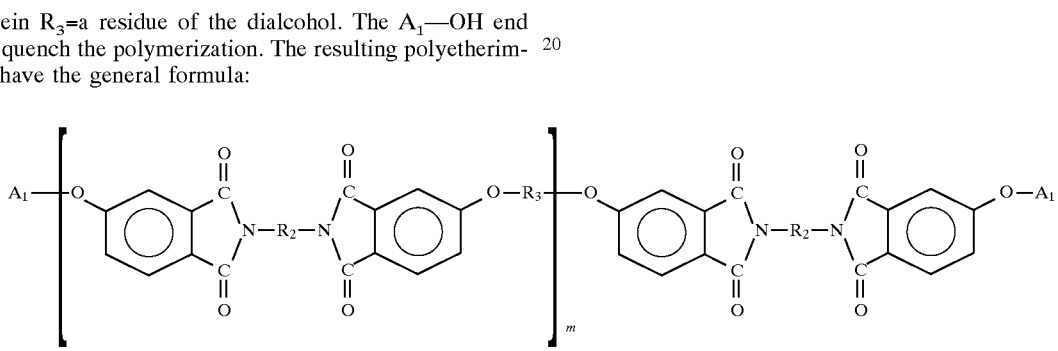

Another preferred synthesis comprises the simultaneous condensation of about 2 m+2 moles of nitrophthalic anhydride with about m+1 moles of dialcohol, m moles of diamine, and 2 moles $A_1$—$NH_2$ in a suitable solvent under an inert atmosphere. Again, the dialcohol may be in the phenate form. The resulting oligomer has a general formula:

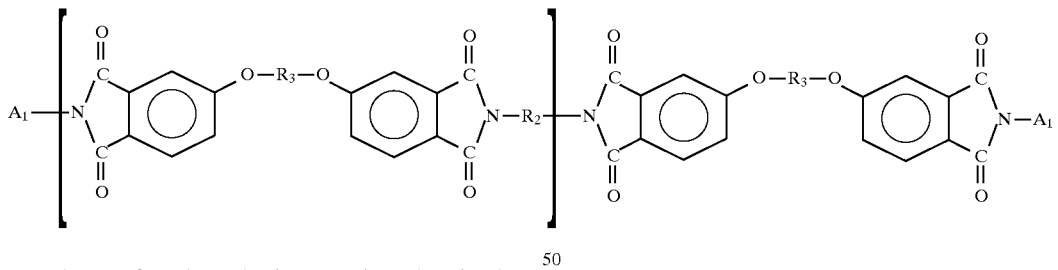

Yet another preferred synthesis comprises the simultaneous condensation of 2 m moles of nitrophthalic anhydride with about m+1 moles of dialcohol, m moles of diamine, and 2 moles of $A_1$—$NO_2$ (a nitro-terminated end cap) in a suitable solvent under an inert atmosphere. Again, the dialcohol may be in the phenate form or a corresponding sulfhydryl (thio) can be used to form a thioether. The resulting oligomer has the general formula:

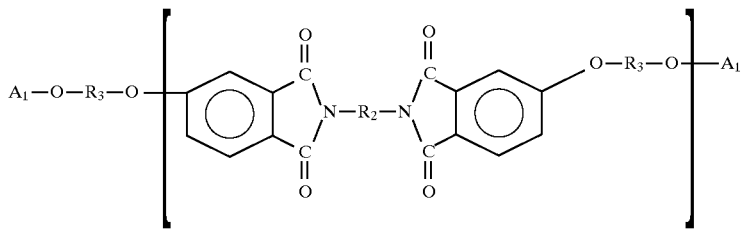

In any of the syntheses, the dialcohol can be replaced by a comparable disulfhydryl of the formula: HS—$R_2$—SH. Mixtures of dialcohols, or disulfhydryls, or dialcohols and disulfhydryls can be used.

Although the bisphenols previously described can be used, for etherimides, the dialcohol is generally a polyaryl compound and preferably is selected from the group consisting of:

HO—Ar—OH;

HO—Ar—L—Ar'—L—Ar—OH;

HO—Ar'—L—Ar—L—Ar'—OH;

wherein

L=—CH$_2$—, —(CH$_3$)$_2$C—, —(CF$_3$)$_2$C—, —O—, —S—, —SO$_2$— or —CO—;

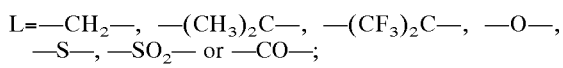

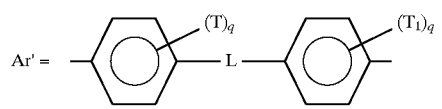

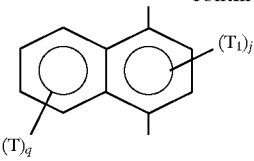

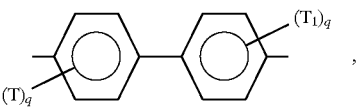

or

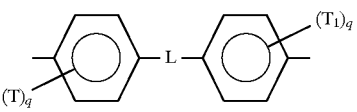

T and T$_1$=lower alkyl, lower alkoxy, aryl, aryloxy, substituted alkyl, substituted aryl, halogen, or mixtures thereof;

q=0–4;

k=0–3; and j=0, 1, or 2.

The dialcohols also include hydroquinone; bisphenol-A; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; a dialcohol having a Schiff base segment, the radical being selected from the group consisting of:

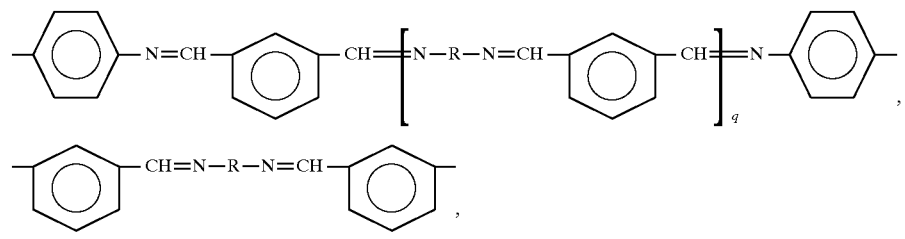

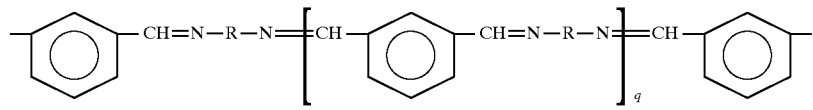

or

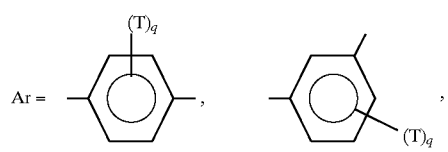

-continued

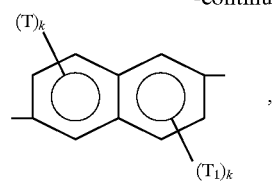

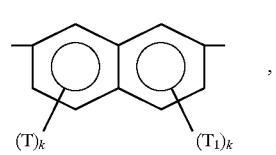

wherein

R is selected from the group consisting of:
phenyl;
biphenyl;
naphthyl; or
a radical of the general formula:

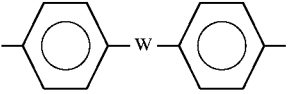

wherein

W=—CH$_2$— or —SO$_2$—; or a dialcohol selected from the group:

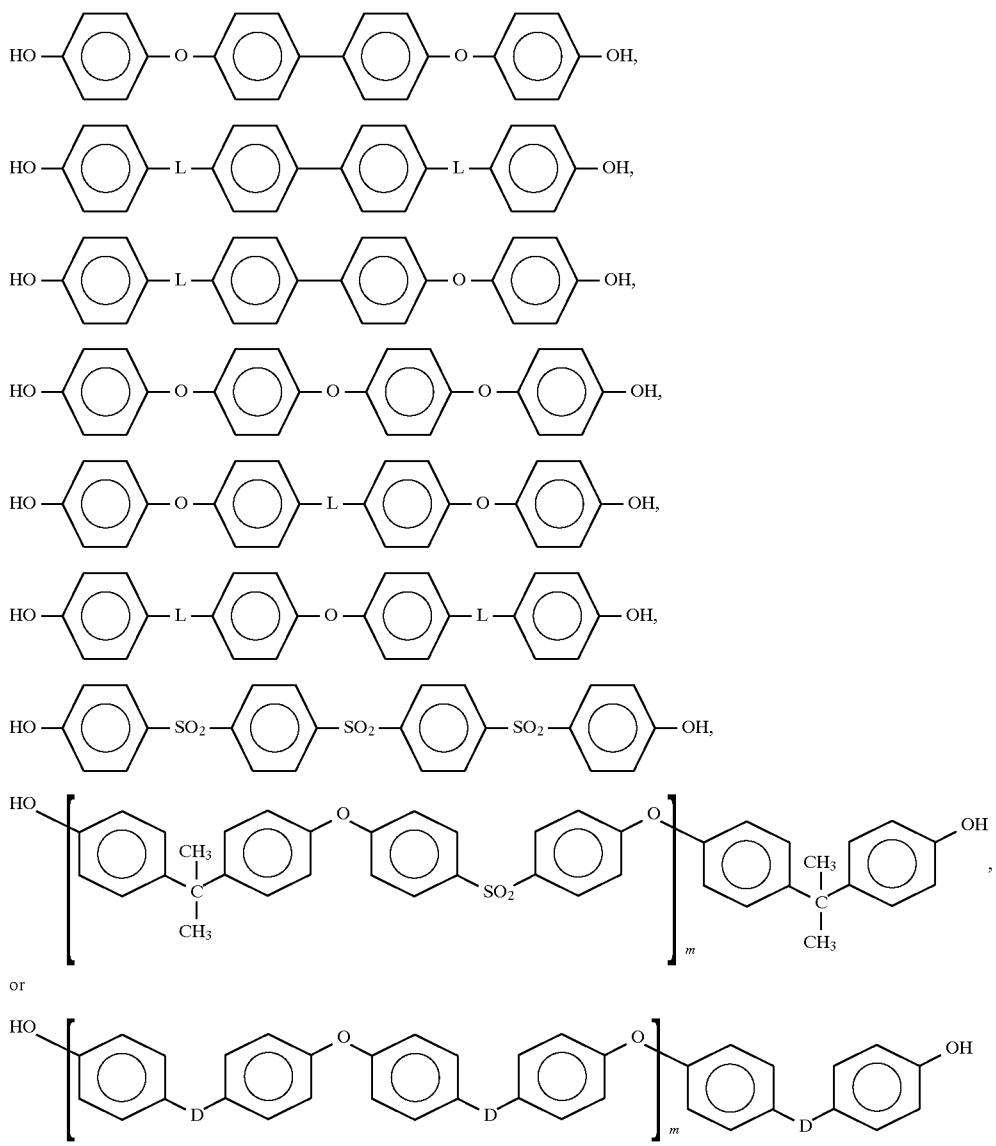

wherein

L is as previously defined;

Me=methyl;

m=an integer, generally less than 5, and preferably 0 or 1; and

D=any of —CO—, —SO$_2$—, or —(CF$_3$)$_2$C—.

While bisphenol-A is preferred in the etherimide synthesis (because of cost and availability), the other dialcohols can be used to add rigidity to the oligomer without significantly increasing the average formula weight, and, therefore, can increase the solvent resistance. Random or a block copolymers are possible.

Furthermore, the dialcohols may also be selected from the those described in U.S. Pat. Nos. 4,584,364; 3,262,914; or 4,611,048. The hydroxy-terminated etherimides of U.S. Pat. No. 4,611,048 can be reacted with A$_1$—NO$_2$ to provide crosslinking etherimides of the present invention.

Dialcohols of this nature are commercially available. Some may be easily synthesized by reacting halide intermediates with bis-phenates, such as by the reaction of 4,4'-dichlorodiphenylsulfone with bis(disodium biphenolate).

The oligomers can be synthesized in a homogeneous reaction scheme wherein all the reactants are mixed at one time (and this scheme is preferred), or in a stepwise reaction. The diamine and dialcohols can be mixed, for example, followed by addition of the nitrophthalic anhydride to initiate the polymerization and thereafter the end caps to quench it. Those skilled in the art will recognize the different methods that might be used. To the extent possible, undesirable competitive reactions should be minimized by controlling the reaction steps (i.e., addition of reactants) and the reaction conditions.

Suitable diamines include those diamines described with reference to the amideimide synthesis.

Anhydrides of the formula:

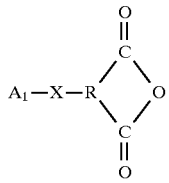

wherein

X=—O— or —S—;

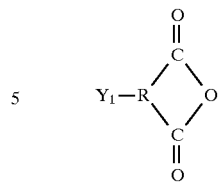

These substituted anhydrides are described in U.S. Pat. Nos. 4,297,474 and 3,847,869.

Polysulfoneimide oligomers corresponding to the etherimides can be prepared by reacting about m+1 moles of a dianhydride with about m moles of a diamine and about 2 moles of an amine end cap ($A_1$—$NH_2$). The resulting oligomer has the general formula:

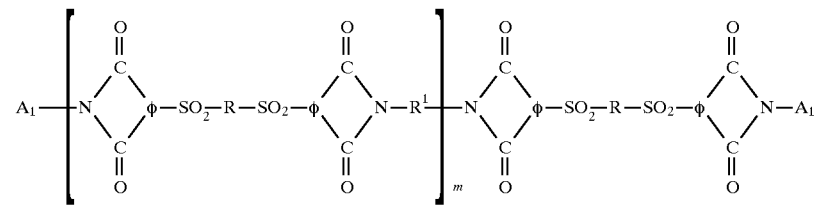

R=a trivalent $C_{(6-13)}$ aromatic organic radical;

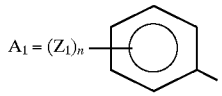

n=1 or 2; and
$Z_1$=D or Z, as previously defined,
are useful in the synthesis of the etherimides of the present invention, and are prepared by the condensation of the corresponding end cap phenol or thiol (—XH) with a nitro- or halo- anhydride that contains the R moiety.

In at least one synthesis of the etherimides, a compound of the formula:

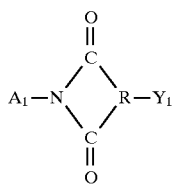

is an intermediate or reactant, wherein:
R=a trivalent $C_{(6-13)}$ aromatic organic radical;

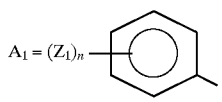

Y=halo or nitro;
n=1 or 2; and
$Z_1$=D, Y, or Z.
This intermediate if formed by reacting A—$NH_2$ with a substituted phthalic anhydride of the formula:

wherein R and R' are divalent aromatic organic radicals having from 2–20 carbon atoms. R and R' may include halogenated aromatic $C_{(6-20)}$ hydrocarbon derivatives; alkylene radicals and cycloalkylene radicals having from 2–20 carbon atoms; $C_{(2-8)}$ alkylene terminated polydiorganosiloxanes; and radicals of the formula:

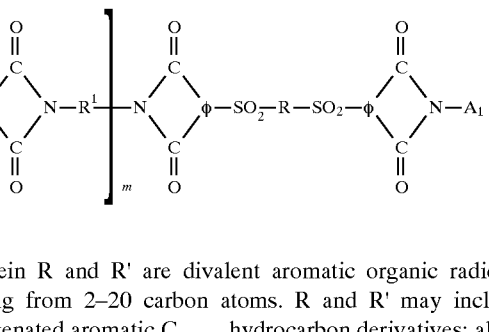

wherein
q=—$C_yH_{2y}$—, —CO—, —$SO_2$—, —O—, or —S—; and
y=1 to 5.

Comparable polymers, usable in blends of the sulfoneimides, are described in U.S. Pat. No. 4,107,147, which is incorporated by reference. Other aromatic dithiodianhydrides are described in U.S. Pat. No. 3,933,862.

Heterocycle or heterocycle sulfone oligomers can be prepared by the condensation of:

(a) 2 moles of an amine, phenol, or sulfhydryl end-cap monomer;

(b) n moles of a four-functional compound, and (c) (n+1) moles of a suitable dicarboxylic acid halide, or by the condensation of:

(a) 2 moles of an acid halide end-cap monomer;

(b) (n+1) moles of a four-functional compound; and (c) n moles of a dicarboxylic acid halide.

Suitable diacid halides include those compounds described with the reference to the amideimide syntheses.

The four-functional compound has the general formula:

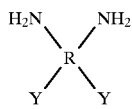

wherein R is an hydrocarbon radical (preferably, an aromatic radical, if the highest thermal stability is sought); Y=—OH, —NH$_2$, or —SH; and the amine functionalities (—NH$_2$) are not substituted on the same carbon atom as the Y substituents. The four-functional compound generally is selected from the group consisting of: dihydoxybenzidine, dimercaptobenzidine, dihydroxydiaminobenzene, dimercaptodiaminobenzene, diaminobenzidine, or a compound having the general formula:

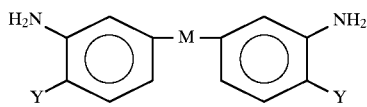

wherein

M=—CO—, —SO$_2$, —(CF$_3$)$_2$C—, —S—, or —O—; and
Y=—OH, —SH, or —NH$_2$.

Isomers of the four-functional compound may also be used so long as the isomers include two pairs of an amine and a "Y" functionality on adjacent carbons on an aromatic radical. The resulting oligomers include oxazole, thiazole, or imidazole linkages.

Capped polyimides are prepared by reacting diamines and dianhydrides, often having one crosslinking functionality on each end and ethersulfone segments alternating with segments formed from unsaturated, aliphatic dianhydrides, like MCTC, as described in U.S. Ser. No. 07/046,376, now abandoned. These polyimides having one crosslinking site are prepared by reacting:

(1) 2 moles of a monoanhydride end cap;
(2) n+1 moles of the diamine; and,
(3) n moles of the dianhydride;

wherein n is a small integer.

The monoanhydride end caps in this case have the general formula:

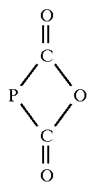

wherein P=

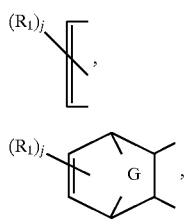

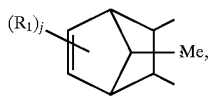

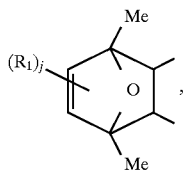

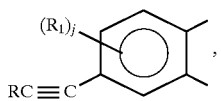

and

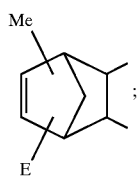

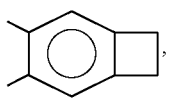

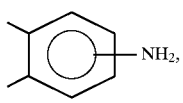

or

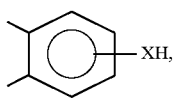

wherein R$_1$, i, j, G, R, Me, and T are as previously defined.

Corresponding polyimide oligomers can be prepared using 2 moles of an amine end cap with n moles of diamine and (n+1) moles of dianhydride. These polyimides can have one or two crosslinking sites at each end of the molecules. Of course, aminophenol or its thio counterpart can be used to provide a monofunctional, capped oligomer that includes an active —OH or —SH functionality.

Preferred diamines for the polyimide condensation include ethersulfone diamines of the general formula:

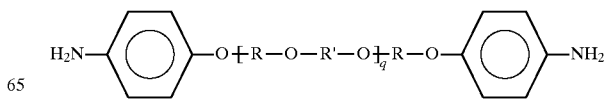

wherein R and R' are aromatic radicals, at least one of R and R' being a diaryl radical wherein the aryl rings are joined by a "sulfone" (i.e. electronegative) linkage, and q is an integer from 0 to 27 inclusive. Preferably R is selected from the group consisting of:

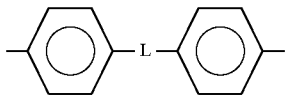

wherein L=—SO$_2$—, —(CF$_3$)$_2$C—, or —S—. R' is preferably selected from the group consisting of:

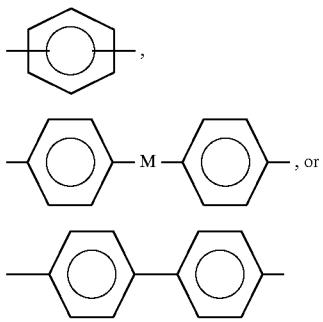

wherein M=—SO$_2$—, —S—, —O—, —(CH$_3$)$_2$C—, or —(CF$_3$)$_2$C—.

Preferred diamines are those in which R is

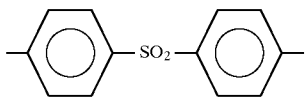

and R' is

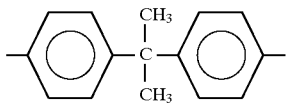

Accordingly, the diamines generally contain at least one phenoxyphenylsulfone group, such as:

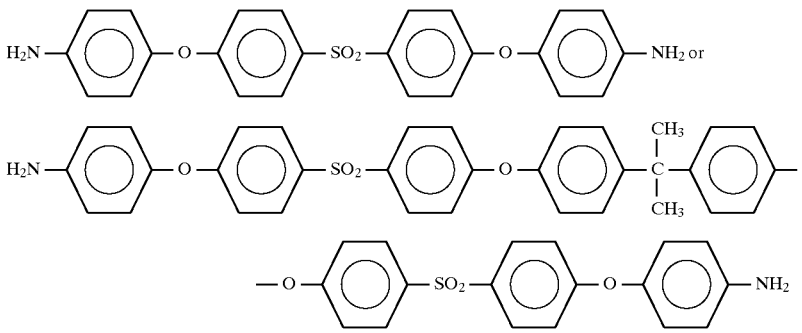

These diamines have alternating ether and "sulfone" linkages, wherein "sulfone" designates an electronegative linkage (—M—) as previously defined.

In the monofunctional, thermoplastic, crosslinkable, polyimide oligomers, the dianhydride preferably is 5-(2,5-diketotetrahydrofuryl)-3-methyl-3-cyclohexene-1,2-dicarboxylic anhydride (MCTC), an unsaturated, aliphatic dianhydride.

The diamines and dianhydrides react to form repeating imide linkages along the generally linear backbone of the oligomers. Preferred properties in the oligomer are obtained when the backbone is periodically disrupted by the inclusion of an aliphatic moiety, especially an MCTC residue.

Diamines which include phenoxyphenylsulfone moieties are preferred, since these diamines provide the blend of physical properties in the oligomers which are desired. Impact resistance and toughness is afforded with the electronegative "sulfone" linkages which act as joints or swivels between the aryl groups. The aliphatic residues, such as those from MCTC, provide lower melt temperatures, and allow the use of lower temperature end caps, such as oxynadic and dimethyl oxynadic (DONA) end caps. The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio).

These polyimide oligomers may be used to form prepregs by the conventional method of impregnating a suitable fabric with a mixture of the oligomer and a solvent. Suitable coreactants, such as p-phenylenediamine, benzidine, and 4,4'-methylenedianiline, may be added to the solvent when preparing prepregs.

The difunctional crosslinking polyimides constitute a broader class of oligomers than the corresponding class of monofunctional polyimides. That is, the diamines and dianhydrides for this difunctional class can be drawn from a broader list, and can include, typically, any aromatic or aliphatic diamine or dianhydride. Lower molecular weight aromatic diamines and dianhydrides are preferred.

To prepare the difunctional crosslinking polyimides the suitable diamines include all those previously described with respect to the amideimide condensation and those with respect to the monofunctional imide condensation. The dianhydrides include any or a mixture of the dianhydrides previously described.

The most preferred linear polyimides are prepared with dianhydrides selected from para- and meta- dianhydrides of the general formula:

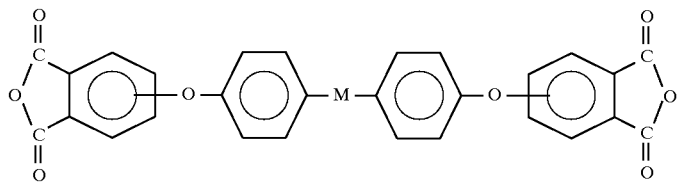

wherein
M=—SO$_2$— or —CO—, reacted with

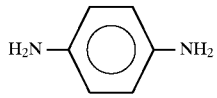

or

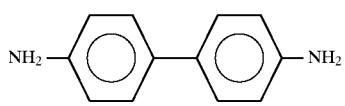

Thermal stabilities in excess of 800° F. are believed to be achievable with these oligomers.

Solvent resistant, thermoplastic aromatic poly (imidesulfone) oligomers are also described in U.S. Pat. Nos. 4,398,021 and 4,489,027. Melt-fusible polyimides made by the condensation of dianhydrides and diamines are described in U.S. Pat. No. 4,485,140.

Polyamides are prepared by condensing dicarboxylic acid halides with diamines and acid halide or amine end caps. There polyamides are generally formed from the diacid halides and diamines that have previously been described.

Polyesters or polyestersulfones are prepared by condensing the diacid halides and dialcohols (i.e., bisphenols, dihydric phenols, or diols) previously described. Polyethers or ethersulfones are prepared by condensing dinitro compounds or dihalogens and dialcohols or by other conventional syntheses wherein suitable end-cap monomers are added to quench the synthesis and to provide one or more coreactive functionalities at each end of the oligomers.

The dihalogens is generally a compound selected from those described previously with respect to the synthesis of diamines. Dinitro compounds are generally prepared by reacting nitrophthalic anhydride with the diamines. Of course, dihalogens can be prepared in the same way by replacing the nitrophthalic anhydride with halophthalic anhydride. Nitroaniline, nitrobenzoic acid, or nitrophenol may also be condensed with dianhydrides, dicarboxylic acid halides, diamines, dialcohols, or dihalogeus to prepare other dinitro compounds that include amide, imide, ether, or ester linkages between the terminal phenyl radicals and the precursor backbones. The synthesis of the dinitro compounds or dihalogens can occur prior to mixing the other reactants with these compounds or the steps can be combined in suitable circumstances to directly react all the precursors into the oligomers. For example, a polyether oligomer can be prepared by simultaneously condensing a mixture of an end cap imidophenol (such as a compound described in U.S. Pat. No. 4,661,604), nitrophthalic anhydride, phenylene diamine, and HO—φ—O—φ—O—φ—O—φ—OH, wherein φ=phenyl.

While other common resin backbones may be capped in a corresponding manner and used in advanced composite blends of the present invention, the linear backbones described above are the most directly suited for aerospace applications.

Although the concept of advanced composite blends is probably best suited to linear morphology, the advanced composite blends of the present invention also include multidimensional oligomers and polymers. Linear morphology is preferred because the resulting composites have mixtures of polymers of relatively large and roughly equivalent average formula weight. The individual polymers are similar in structure. We have found it difficult in many circumstances to process multidimensional oligomers that have appreciable average formula weights, so the properties of composites made from multidimensional advanced composite blends might suffer because of diversity of formula weights. Furthermore, the addition polymerization reaction for multidimensional oligomers results in formation of a complex, 3-dimensional network of crosslinked oligomers that is difficult or impossible to match with the multidimensional polymers, because these polymers simply have extended chains or short chains. That is, upon curing, the multidimensional oligomers crosslink to chemically interconnect the arms or chains through the end caps, thereby forming a network of interconnected hubs with intermediate connecting chains. The connecting chains have moderate formula weight, although the cured oligomer can have appreciable formula weight. In contrast, the polymer (which does not crosslink) simply has a hub with arms of moderate formula weight. While, for linear morphology, the disadvantages of blended composites that have a wide diversity of average formula weight polymers as constituents can be overcome by curing relatively low formula weight oligomers into relatively high average formula weight cured polymers that are roughly equivalent to the polymer constituents, the polymers in the multidimensional morphology are likely to have average formula weights lower than the oligomeric component. Therefore, we believe that the best results for the present invention may be achieved with systems having linear morphology.

Although we have yet to verify our theory experimentally, it may be possible and desirable to synthesize the polymeric component of the multidimensional advanced composite blend when curing the oligomer, and, in that way, forming relatively comparable oligomeric and polymeric networks. To achieve this effect, we would mix, for example, a multidimensional oligomer with comparable polymeric precursors, such as triamines and tricarboxylic acid halides. Upon curing, the precursors would condense to form amide linkages to form bridges between hubs in a manner comparable to the oligomeric connecting chains.

The potential problem of structural mismatch and the proposed solution for achieving comparable average formula weights in multidimensional advanced composite blends will probably be better understood after the oligomers and blends are described in greater detail.

A multidimensional oligomer includes an aromatic hub and three or more radiating chains or arms, each chain terminating with a crosslinking end cap segment. Each chain includes the resin linkages previously described. Each chain is substantially the same. For example, a multidimensional ether can be prepared by the simultaneous condensation of phloroglucinol with a dihalogen and an imidophenol end cap monomer.

In multidimensional oligomers the higher density of crosslinking functionalities in a multidimensional array provides increased thermo-oxidative stability to the cured composites. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, azaline (e.g., melamine), or other aromatic moieties may also be used as the hub radical.

Details of the several preferred multidimensional oligomers will now be described in a manner similar to that used for the linear oligomers.

Multidimensional polyamideimide oligomers include oligomers of the general formula:

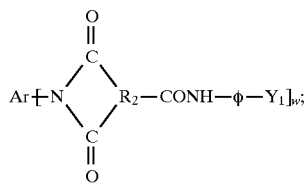
(e)

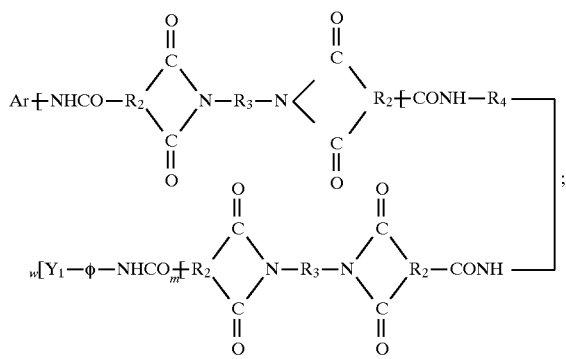
(f)

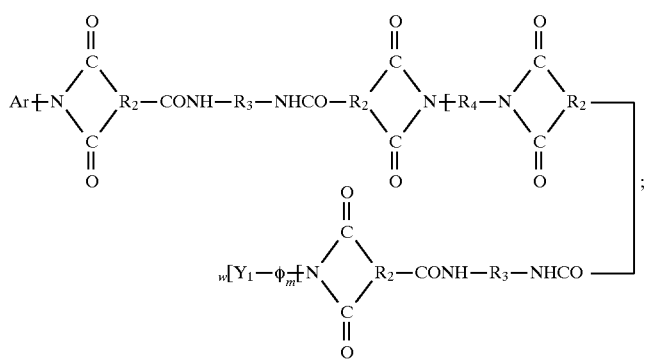
(g)

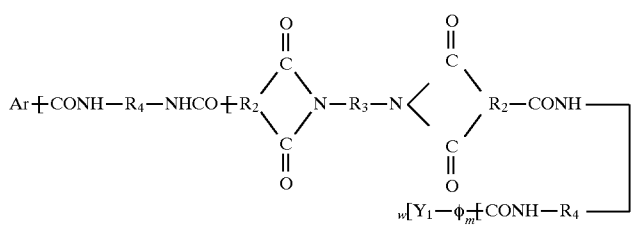
(h)

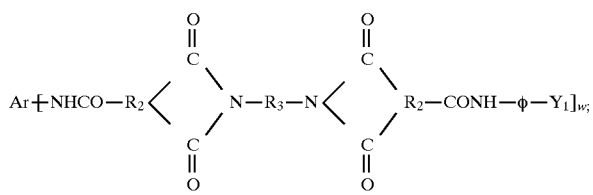
(i)

-continued
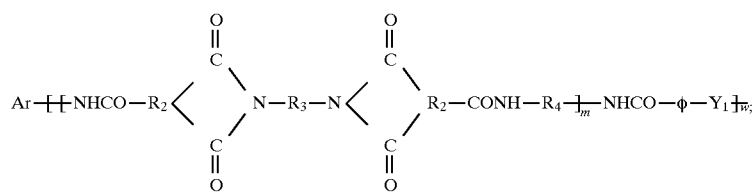 (j)
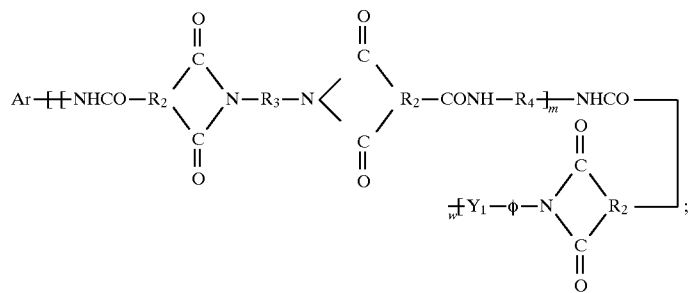 (k)
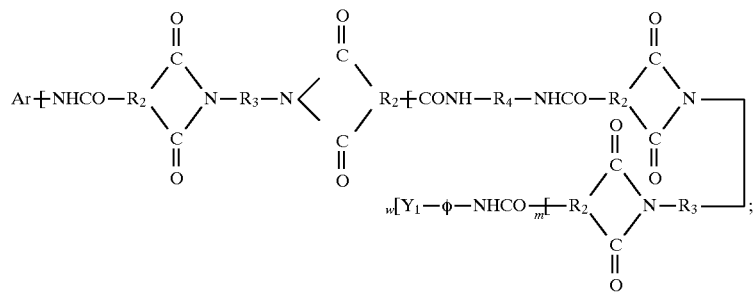 (l)
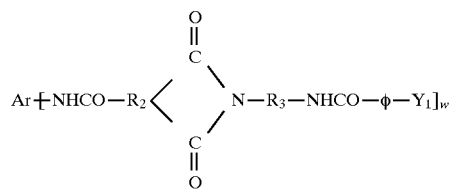 (m)
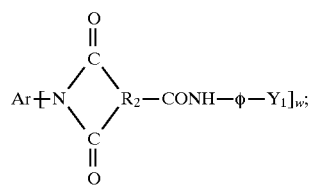 (n)
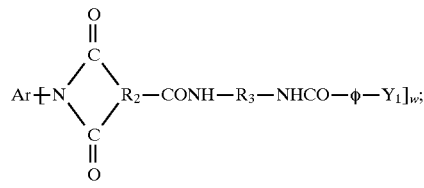 (o)

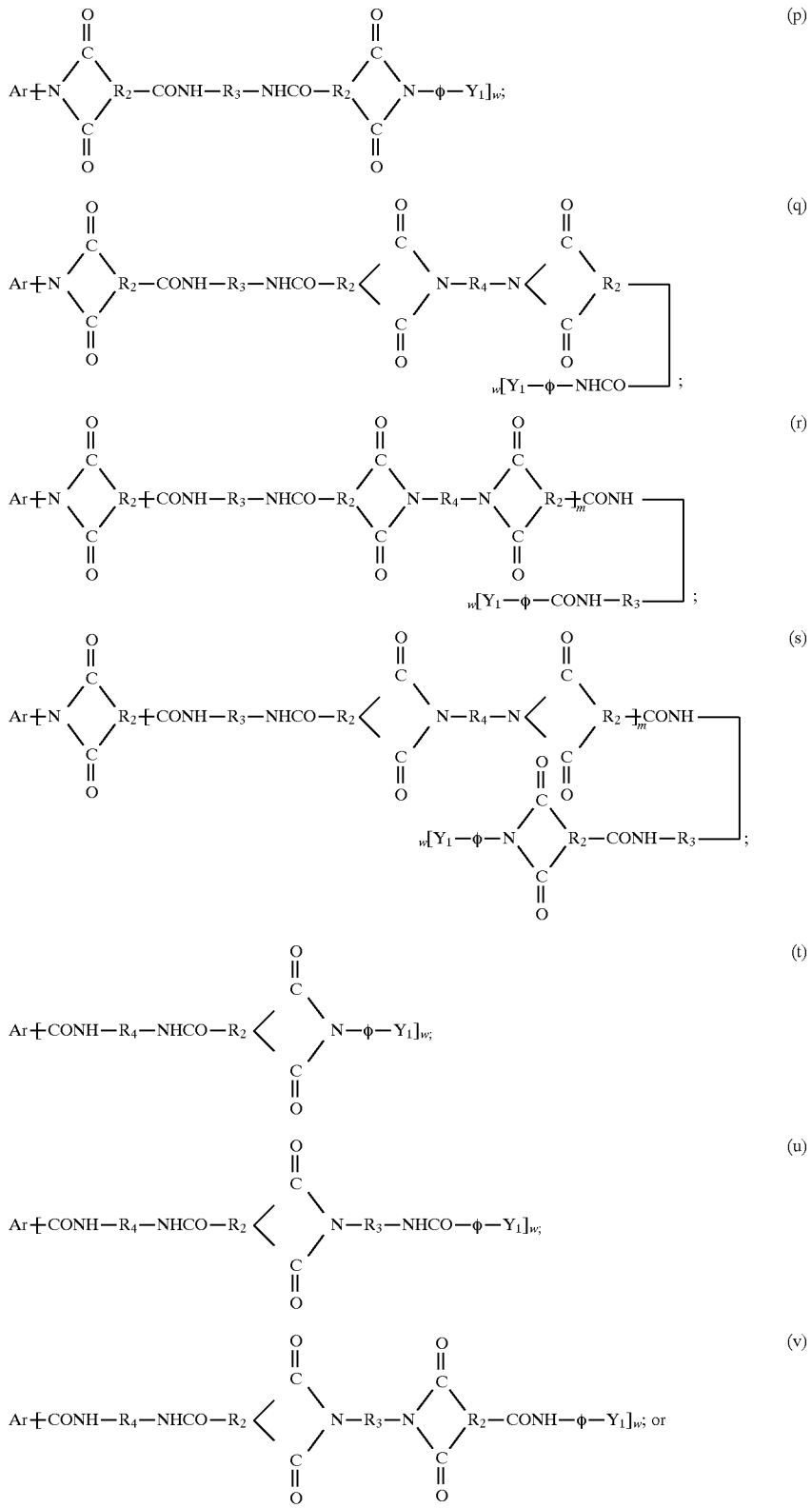
wherein Y, $R_2$, $R_3$, $R_4$, and m are as previously defined with respect to the linear amideimides, Ar=an organic radical of valency w; $\phi$=phenyl, and w=3 or 4. Preferably, Ar is an aromatic radical (generally phenyl) generally selected from phenyl, naphthyl, biphenyl, azalinyl (such as melamine), or triazine derivatives of the general formula:

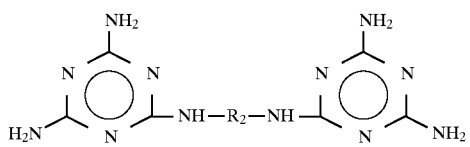

wherein $R_5$=a divalent hydrocarbon residue containing 1–12 carbon atoms, as described in U.S. Pat. No. 4,574,154.

The hub may also be a residue of an etheranhydride of the formula:

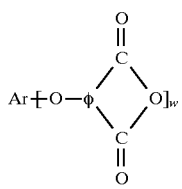

or an etheramine of the formula:

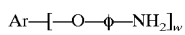

The best results are likely to occur when the arm length of the oligomers is as short as possible (to allow ease of processing) and the oligomer has six crosslinking sites (to allow the highest density of crosslinking). The most preferred hub includes the phenyl radical, since these compounds are relatively inexpensive, are more readily obtained, and provide oligomers with high thermal stability.

The chains of the oligomers include crosslinking end caps which improve the solvent-resistance of the cured composites. These end caps may be thermally or chemically activated during the curing step to provide a strongly crosslinked, complex, multi-dimensional array of interconnected oligomers. When the goal is an advanced composite having a glass transition temperature above 900° F. (and preferably above 950° F.) each end cap should have high thermal stability and a high thermal activation temperature. End caps with two crosslinking functionalities (difunctional end caps) are expected to yield the highest crosslinked arrays, which may be the most stable.

The oligomers may be formed by the attachment of arms to the hub followed by chain extension and chain termination. For example, trihydroxybenzene may be mixed with p-aminophenol and 4,4'-dibromodiphenylsulfone and reacted under an inert atmosphere at an elevated temperature to achieve an amino-terminated "star" of the general formula:

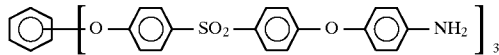

that can be reacted with suitable diacid halides, diamines, and end caps to yield a polyamideimide oligomer.

The etheranhydride hub can be synthesized by reacting nitrophthalic anhydride or halophthalic anhydride with Ar(—OH)$_w$ in a suitable solvent under an inert atmosphere, as described generally in U.S. Pat. Nos. 3,933,862 and 4,851,495 (thio-analogs).

The oligomers of course, might be made by reacting nitrophthalic anhydride with an amine end cap followed by the condensation with the hydroxy hub or in similar reaction schemes that will be understood by those of ordinary skill.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

Linear or multidimensional oligomers can be synthesized from a mixture of four or more reactants so that extended chains may be formed. Adding components, however, adds to the complexity of the reaction and of its control. Undesirable competitive reactions may result or complex mixtures of macromolecules having widely different properties may be formed, because the chain extenders and chain terminators are mixed, and compete with one another.

Multidimensional etherimides can be made by reacting the etheranhydride hub with compounds of the formulae II, III, and IV previously described.

Multidimensional amides are prepared by condensing a nitro, amine, or acid halide hub with suitable diamines, dicarboxylic acid halides, and amine or acid halide end cap monomers to form oligomers of the general formulae:

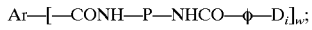

or

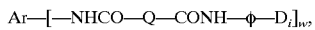

wherein Ar, w, —φ—, i, and D are as previously defined, P=a residue of a diamine, and Q=a residue a dicarboxylic acid halide. If made using anhydride end cap monomers, such as one selected from:

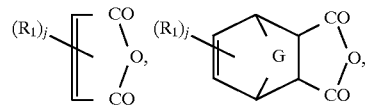

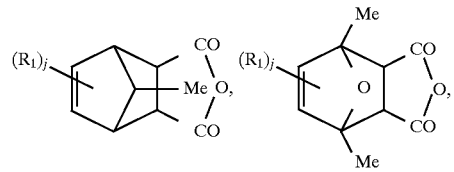

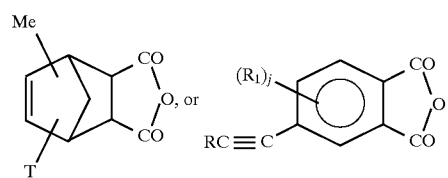

the multidimensional oligomers include those of the formulae:

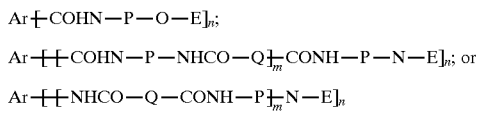

wherein E=a residue of the above identified anhydrides, and P and Q as previously described.

Multidimensional imides can be made using the amine, etheranhydride, or etheramine hubs with suitable diamines, dianhydrides, and amine or anhydride end caps, as will be understood by those of ordinary skill. Particularly preferred multidimensional imides include those prepared by condensing anhydride end caps directly with the amine hubs.

Multidimensional polyesters can be made using hydroxy or carboxylic acid hubs (particularly cyuranic acid) with suitable diols and diacid halides. Carboxylic acid hubs include those compounds described in U.S. Pat. No. 4,617,390 and compounds prepared by reacting polyols, such as phloroglucinol, with nitrobenzoic acid or nitrophthalic acid to form ether linkages and active, terminal carboxylic acid funtionalities. The nitrobenzoic acid products would have three active sites while the nitrophthalic acid products would have six; each having the respective formula:

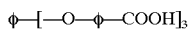

or

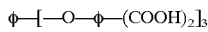

wherein φ=phenyl. Of course other nitro/acids can be used.

Hubs can also be formed by reacting the corresponding halo-hub (such a tribromobenzene) with aminophenol to form triamine compounds represented by the formula:

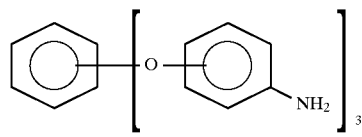

which can then be reacted with an acid anhydride to form a polycarboxylic acid of the formula:

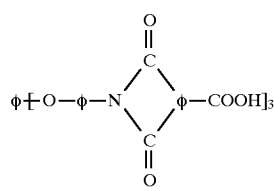

wherein φ=phenyl; the hub being characterized by an intermediate ether and imide linkage connecting aromatic groups. Thio-analogs are also contemplated, in accordance with U.S. Pat. No. 3,933,862.

The hub may also be a polyol such as those described in U.S. Pat. No. 4,709,008 to tris(hydroxyphenyl)alkanes of the general formula:

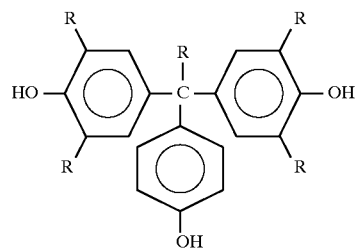

wherein R=hydrogen or methyl and can be the same or different. The polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469).

The polyols may also be reacted with nitrophthalic anhydride, nitroaniline, nitrophenol, or nitrobenzoic acids to form other compounds suitable as hubs as will be understood by those of ordinary skill.

Phenoxyphenyl sulfone arms radiating from a hub with a terminal amine, carboxylic acid, or hydroxyl group are also precursors for making multidimensional polyester oligomers of the present invention.

The best results are likely to occur when the hub is phloroglucinol or cyuranic acid. In either case a suitable end-cap monomer (phenol or acid halide) can be reacted with the hub to form "short-armed," a multidimensional oligomers having three or six crosslinking sites. These compounds are the simplest multidimensional oligomers and are relatively inexpensive to synthesize.

Multidimensional amides, amide imides, heterocycles, and heterocycle sulfones can be prepared using these carboxylic acid hubs, as will be understood by those of ordinary skill in the art.

Multidimensional oligomers of the formula:

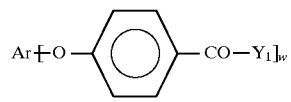

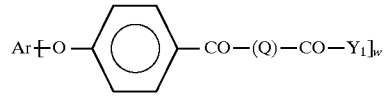

can also be synthesized with an Ullmann aromatic ether synthesis followed by a Friedel-Crafts reaction, as will be further explained.

Here, Q=

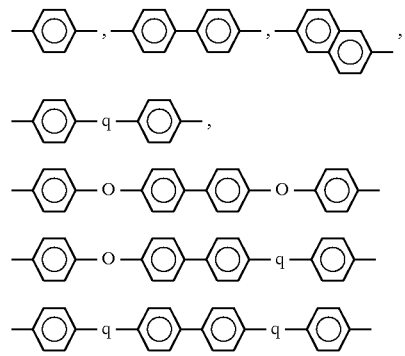

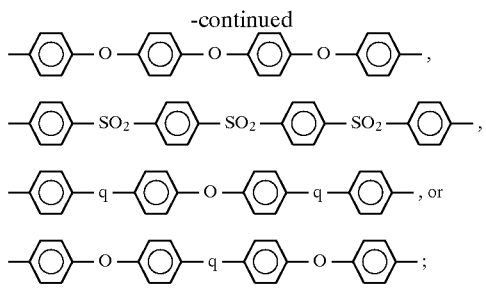

$q$ = —$SO_2$—, —CO—, —S—, or —$(CF_3)_2C$—, and preferably —$SO_2$—, or —CO—; and $Y_1$ = a crosslinking end cap as previously defined (i.e. $D_i$—ϕ—).

To form the Ar——O—ϕ—CO—$Y_1]_w$ oligomers, preferably a halosubstituted hub is reacted with phenol in DMAC with a base (NaOH) over a Cu Ullmann catalyst to produce an ether "star" with active hydrogens para- to the ether linkages. End caps terminated with acid halide functionalities can react with these active aryl groups in a Friedel-Crafts reaction to yield the desired product. For example, 1 mole of trichlorobenzene can be reacted with about 3 moles of phenol in the Ullmann ether reaction to yield an intermediate of the general formula: ϕ—(—O—ϕ)$_3$, which can be reacted with about 3 moles of ($Y_1$)—COCl to produce the final, crosslinkable, ether/carbonyl oligomer.

Similarly, to form the Ar—[—O—ϕ—CO—Q—CO—$Y_1]_w$ oligomers, the hub is extended preferably by reacting a halo-substituted hub with phenol in the Ullmann ether synthesis to yield the ether intermediate of the Ar—[—O—ϕ—CO——$Y_1]_w$ compounds. This intermediate is mixed with the appropriate stoichiometric amounts of a diacid halide of the formula XOC—Q—COX and an end cap of the formula $D_i$—ϕ in the Friedel-Crafts reaction to yield the desired, chain-extended ether/carbonyl star and star-burst oligomers.

The end caps crosslink at different temperatures (i.e. their unsaturation is activated at different curing temperatures), so the cap should be selected to provide cured composites of the desired thermal stability. That is, the backbone of the oligomer should be stable to at least the cure temperature of the caps. The multidimensional morphology allows the oligomers to be cured at a temperature far below the use temperature of the resulting composite, so completely aromatic backbones connected by heteroatoms are preferred to enhance the thermal stability.

Blends can improve impact resistance of pure oligomer composites without causing a significant loss of solvent resistance. The advanced composite (i.e. mixed chemical) blends of the present invention comprise mixtures of one or more crosslinkable oligomer and one or more polymer from a different chemical family. The polymers are incapable of crosslinking. The crosslinkable oligomer and the compatible polymer can be blended together by mixing mutually soluble solutions of each. While the blend is often equimolar in the oligomer and polymer, the ratio of the oligomer and polymer can be adjusted to achieve the desired physical properties. The properties of the composite formed from the advanced composite blend can be adjusted by altering the ratio of formula weights for the polymer and oligomer.

In synthesizing the polymers, quenching compounds can be employed, if desired, to regulate the polymerization of the comparable polymer, so that, especially for linear systems, the polymer has an average formula weight initially substantially greater than the crosslinkable oligomer. For thermal stability, an aromatic quenching compound, such as aniline, phenol, or benzoic acid chloride is preferred. The noncrosslinking polymer can be made by the same synthetic method as the oligomer with the substitution of a quenching cap for the crosslinking end cap.

While the best advanced composite blends are probably those of modest formula weight and those in which the oligomer and polymer are in equimolar proportions, other compositions may be prepared, as will be recognized by those of ordinary skill in the art.

Solvent resistance of the cured composite may decrease markedly if the polymer is provided in large excess to the oligomer in the blend.

The advanced composite blends may, in the case of coreactive oligomers and in other cases, include multiple oligomers or multiple polymers, such as a mixture of an amideimide oligomer, an amide oligomer, and an imide polymer or a mixture of an amideimide oligomer, an amideimide polymer, and an imide polymer (i.e. blended amideimide further blended with imide). When polyimide oligomers are used, the advanced composite blend can include a coreactant, such as p-phenylenediamine, benzidine, or 4,4'-methylene-dianiline. Ethersulfone oligomers can include these imide coreactants or anhydride or anhydride-derivative coreactants, as described in U.S. Pat. No. 4,414,269. Other combinations of oligomers, polymers, and coreactants can be used, as will be recognized by those of ordinary skill in the art.

As discussed above, the oligomeric component of the advanced composite blend may itself be a blend of the oligomer and a compatible polymer from the same chemical family, further blended with the compatible polymer from the different family. The advanced composite blends, also, can simply be made from three or more oligomeric or polymeric components. They generally include only one oligomeric component unless coreactive oligomers are used.

The advanced composite blends may yield semi-interpenetrating networks of the general type described by Egli et al., "Semi-Interpenetrating Networks of LARC-TPI" available from NASA-Langley Research Center.

The coreactive oligomer blends used in the advanced composite blends of the present invention are prepared by mixing mutually soluble mixtures of the two (or more) resins, as with making oligomer-polymer blends.

As suggested at the outset of the discussion of multidimensional morphology, formula weight matching in the cured composite poses a problem. We have found it difficult to process high average formula weight multidimensional oligomers, so we suspect that it will be difficult to prepare an advanced composite blend that includes a polymer of relatively high average formula weight. To overcome this potential problem, we theorize that it may be possible to prepare a blend that includes the oligomer and polymeric precursors. For example, a polyether oligomer of the general formula:

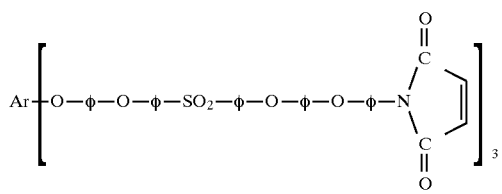

might be mixed with polyamide polymeric precursors of the general formulae:

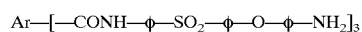

and

Ar—[—NHCO—Q—COOH]₃ wherein Ar=an aromatic hub, φ=phenyl, and Q=a residue of a dicarboxylic acid, so that, upon curing, the oligomer crosslinks and the polymeric precursors condense through the amine and acid to form a polyamide polymer. This approach may be best suited for the lower curing oligomers. The product may include addition polymers and block copolymers of the oligomer and one or both of the polymeric precursors.

Generally the coreactive oligomer blends are selected to tailor the physical properties of the resulting block copolymer composites. For example, stiffening can be achieved for a composite made from an ethersulfone oligomer by adding a benzoxazole oligomer as a coreactant. Those skilled in the art will recognize the benefits to be gained through coreactive oligomer blends. The relatively stiff and rigid heterocycle oligomers can be toughened in this way.

Dopants for creating semiconductive or conductive composites with "Schiff base" oligomers are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the oligomers or polymers to form charge transfer complexes. N-type semiconductors result from doping with alkali metal dispersions. P-type semiconductors result from doping with elemental iodine or perchlorates. Dopant should be added to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are:

(a) unstable in air;
(b) unstable at high temperatures;
(c) brittle after doping;
(d) toxic because of the dopants; or
(e) intractable.

These problems are overcome or significantly reduced with the conductive oligomers of the present invention.

As used in describing the suitable diacid halides and diamines, "Schiff base" is used throughout this specification in a generic way rather than in its typical chemical way, and is used to represent conductive linkages, such as —CH=N—, oxazoles, thiazoles, imidazoles, or mixtures thereof. The heterocycle oligomers may simply need to be doped to exhibit semiconductive properties, and —CH=N— bonds may be unnecessary.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention, include "sulfone" (i.e., electronegative) linkages interspersed along the backbone providing a mechanical swivel for the rigid, conductive segments of the arms. Phenoxyphenylsulfone or phenoxyphenylketone moieties are preferred to provide added toughness.

The advanced composite blends of the present invention can be combined with reinforcing materials and cured to composite materials using heat or chemicals to activate crosslinking or interlinking between end caps. Prepregs can be prepared by conventional prepregging techniques. While woven fabrics are the typical reinforcement, the fibers can be continuous or discontinuous (in chopped or whisker form) and may be ceramic, organic, carbon (graphite), or glass, as suited for the desired application. Curing generally is conducted in conventional vacuum bagging techniques at elevated temperatures. The curing temperature varies with the choice of end cap. If desired, mixtures of end caps might be used.

The advanced composite blends of the present invention can also be used as adhesives, varnishes, films, and coatings.

Although polyaryl compounds are generally described, aliphatic moieties can be included in the backbones, in some cases, although the ultimate use temperatures of these oligomers or composites may be lower than those oligomers that have entirely polyaryl backbones.

While para isomerization has primarily been shown, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

HYPOTHETICAL EXAMPLES

1. Synthesis of Compound (a)

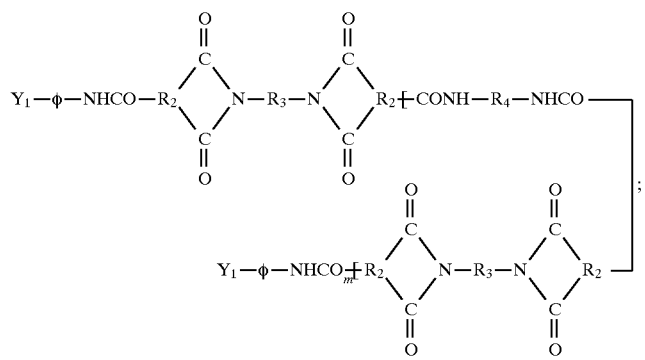

A diamine of the formula H₂N—R₃—NH₃ is reacted with two moles of an acid anhydride of the formula:

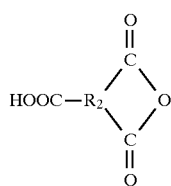

to form a dicarboxlic acid intermediate of the formula:

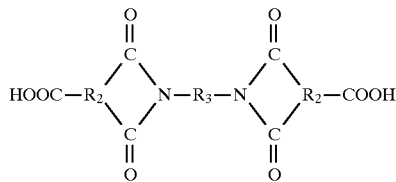

The intermediate is converted to the corresponding diacid chloride in the presence of $SOCl_2$, which is then condensed with one mole of a diamine of the formula $H_2N$—$R_4$—$NH_2$ and two moles of an amine end cap of the formula $Y_i$—φ—$NH_2$ to yield the desired product.

If excess diamine of the formula $H_2N$—$R_4$—$NH_2$ is used along with an acid halide end cap of the formula $Y_i$—φ—COX, the product can have the formula:

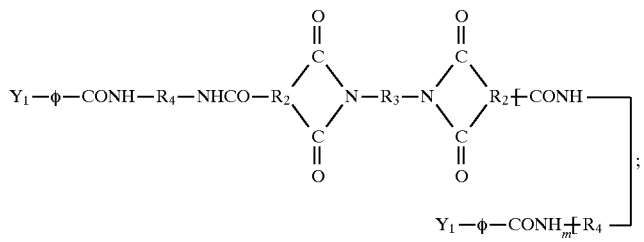

A diamine of the formula $H_2N$—$R_3$—$NH_2$ is reacted with

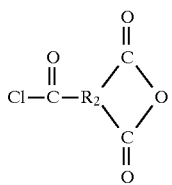

to yield a dianhydride intermediate of the formula:

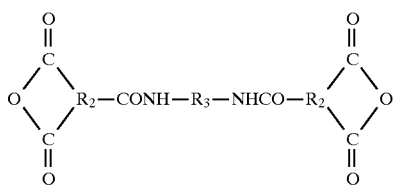

The intermediate is then condensed with $Y_i$—O—$NH_2$ and a diamine of the formula $H_2N$—$R_4$—$NH_2$ to yield the desired product.

2. Synthesis of compound (b)

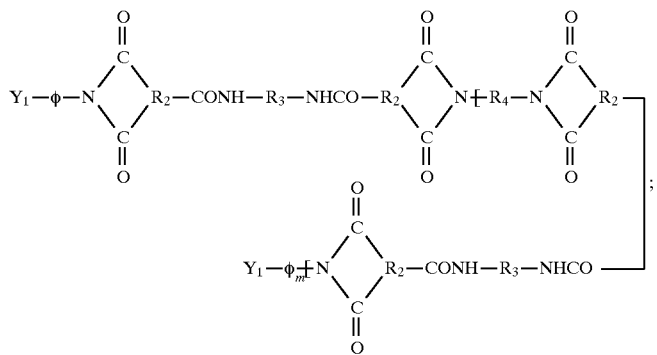

3. Synthesis of compound (d)

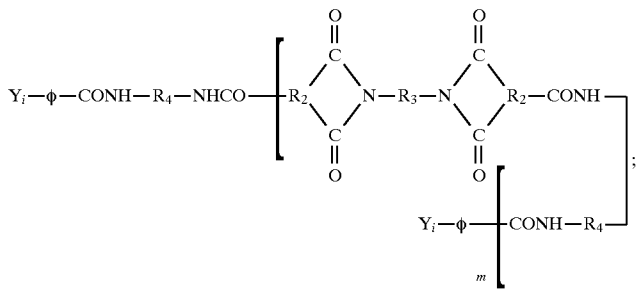

A diamine of the formula $H_2N-R_3-NH_2$ is reacted with an acid anhydride as in Example 1 to form a dicarboxylic acid intermediate that can be reacted with another diamine of the formula $H_2N-R_4-NH_2$ and an acid halide end cap of the formula $Y_i-O-COCl$ to yield the desired product.

4. Synthesis of compound (e)

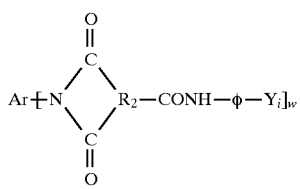

An aromatic hub like triaminobenzene is condensed with a phthalyl acid anhydride and an amine end cap to yield the desired product.

5. Synthesis of compound (f)

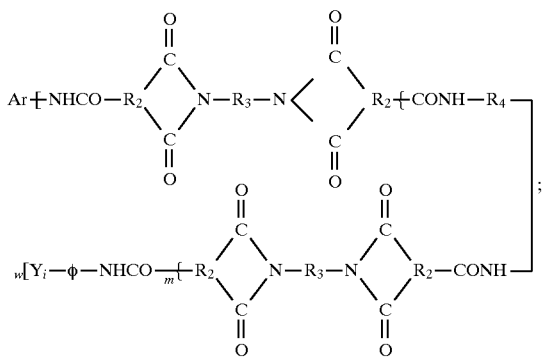

An amine-substituted hub like triaminobenzene, is reacted with the dicarboxylic acid intermediate of Example 1, a diamine of the formula $H_2N-R_4-NH_2$, and an amine end cap in the ratio of 1 mole of hub: (w) (m+1) moles of intermediate: (w) (m) moles of diamine:w moles of end cap to prepare the desired multidimensional product.

6. Synthesis of compound (g)

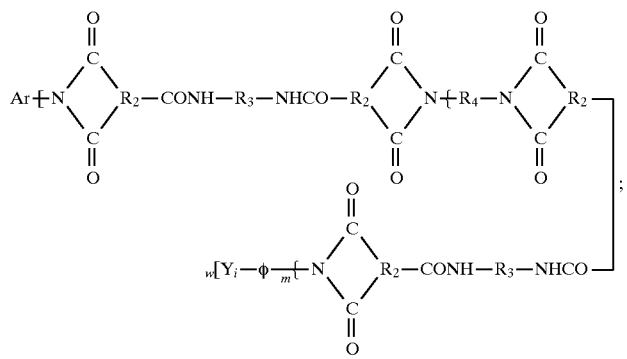

An aromatic amine hub is reacted with the dianhydride intermediate of Example 2, a diamine of the formula $H_2N-R_4-NH_2$, and an amine end cap on the ratio of 1 mole hub:(w) (m+1) moles dianhydride:(w) (m) moles diamine:w moles end cap to yield the desired product.

7. Synthesis of compound (h)

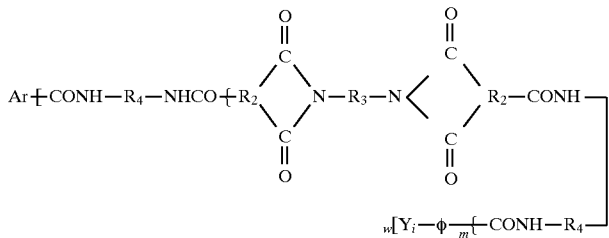

An aromatic acid or acid halide hub, like cyuranic acid, is reacted with a diamine of the formula $H_2N-R_4-NH_2$, a dicarboxylic acid intermediate of Example 1, and an acid halide end cap in the ratio of 1 mole hub:(w) (m+1) moles diamine:(w) (m) moles intermediate:w moles end cap to yield the desired product.

8. Synthesis of compound (i)

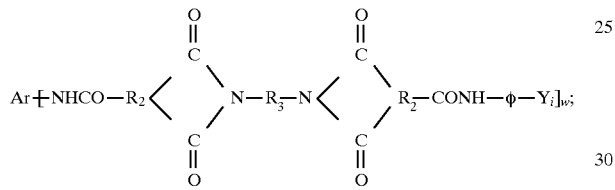

An aromatic amine hub is reacted with a dicarboxylic acid intermediate (or dihalide) of Example 1 and an amine end cap on the ratio of 1 mole hub:w moles intermediate:w moles cap to yield the desired product.

9. Synthesis of compound (1)

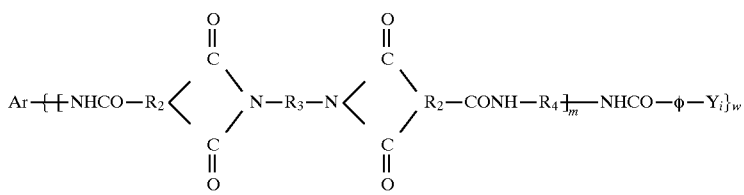

An aromatic amine hub is reacted with the intermediate of Example 8, a diamine, and an acid halide end cap in the ratio of 1 mole hub:w moles intermediate:w moles diamine, and w moles cap to form the desired product.

10. Synthesis of compound (k)

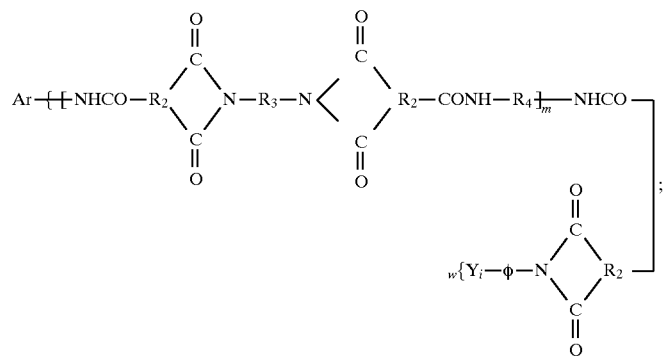

An aromatic amine hub is reacted with the intermediate of Example 1, a diamine of the formula $H_2N-R_4-NH_2$, and an acid or acid halide end cap of the formula:

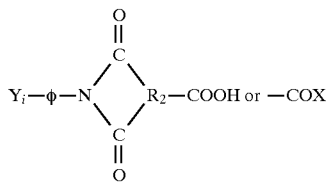

on the ratio of 1 mole hub:(w) (m) moles intermediate:(w) (m) moles diamine:w moles end cap to form the desired product.

The end cap is prepared by condensing an amine end cap of the formula: $Y_i-\phi-NH_2$ with an acid anhydride of the formula:

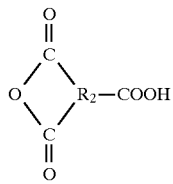

The acid halide is prepared from the acid in the presence of $SOCl_2$.

11. Synthesis of compound (1)

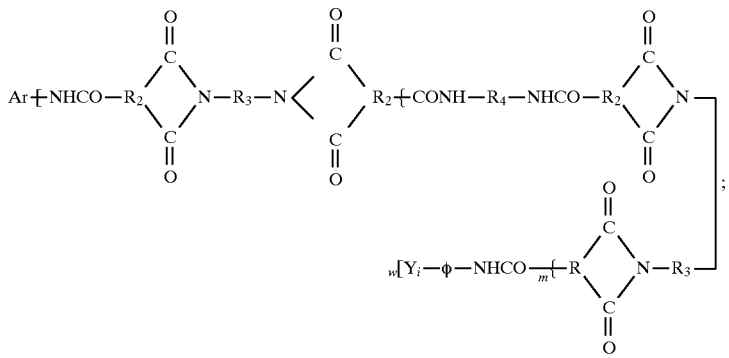

An aromatic amine hub is reacted with the dicarboxylic acid intermediate of Example 1, a diamine of the formula: $H_2N-R_3-NH_4$, and an amine end cap in the ratio of 1 mole hub:(w) (m+1) moles intermediate:(w) (m) moles diamine:w moles end cap to form the desired product.

12. Synthesis of compound (m)

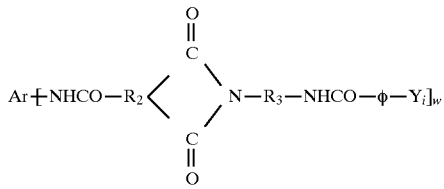

An aromatic amine hub is reacted with an acid halide anhydride of the formula:

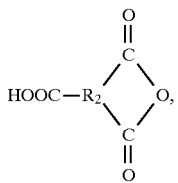

a diamine, and an acid halide end cap in the ratio of 1 mole hub:w moles acid halide anhydride:w moles diamine:w moles end cap to form the desired product. Preferably the reaction occurs in two steps with the reaction of occurs on two steps with the reaction of the hub and acid halide anhydride followed by the addition of the diamine and end cap.

13. Synthesis of compound (n)

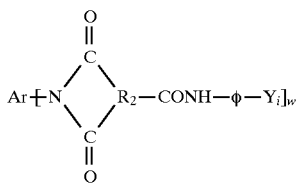

An aromatic amine hub is reacted with an acid anhydride of the formula:

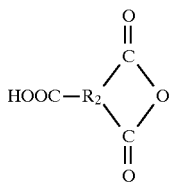

and an amine end cap on the ratio of 1 mole hub:w moles acid anhydride:w moles end cap to form the desired product.

14. Synthesis of compound (O)

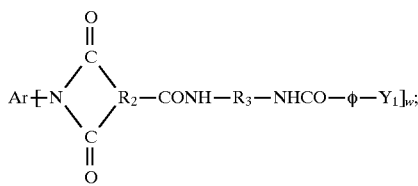

An aromatic amine hub is reacted with the acid anhydride of Example 13, a diamine of the formula $H_2N-R_3-NH_2$, and an acid halide end cap in the ratio of 1 mole hub:w moles acid anhydride:w moles diamine:w moles end cap to yield the desired product. Preferably the reaction occurs in two steps comprising the initial reaction between the hub and the acid anhydride with the subsequent simultaneous addition of the diamine and end cap.

hub to form an intermediate of the formula:

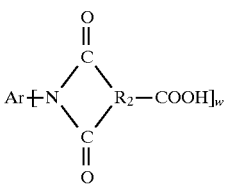

prior to adding the diamine and end cap conjugate.

Alternatively, the product can be made by reacting the hub with dianhydride intermediate of Example 2 and an amine end cap.

16. Synthesis of compound (g)

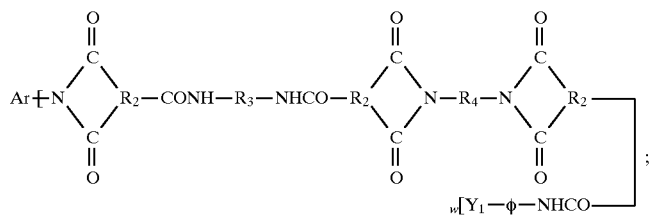

15. Synthesis of compound (p)

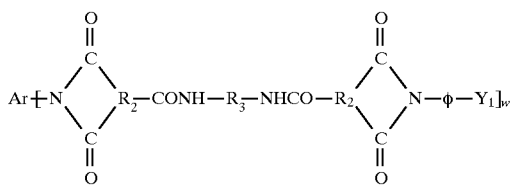

An aromatic amine hub is reacted with an acid anhydride of Example 13, a diamine of the formula $H_2N-R_3-NH_2$, and an amine end cap in the ratio of 1 mole hub:2 w moles acid anhydride:w moles diamine:w moles end cap to yield the desired product. Preferably the end cap and half of the acid anhydride are mixed to form an end cap conjugate of the formula:

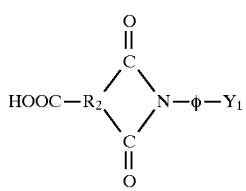

prior to mixing the reactants to form the oligomer. It also may be wise to mix the remaining acid anhydride with the An aromatic amine hub is reacted with the intermediate of Example 2, a diamine of the formula: $H_2N-R_4-NH_2$, and an end cap conjugate formed by reacting an end cap amine with an acid halide anhydride of the formula:

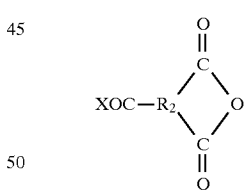

in the ratio of 1 mole hub:w moles intermediate:w moles end cap conjugate. The conjugate has the formula:

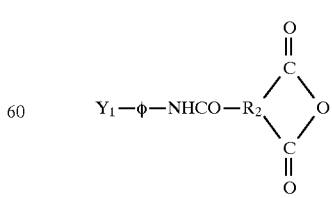

Alternatively, the product can be prepared by reacting the hub with an acid anhydride of the formula:

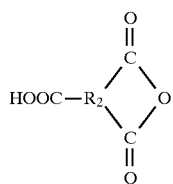

followed by reaction with an amine of the formula $H_2N$—$R_3$—$NH_2$, the intermediate of Example 11 and an amine end cap. Stepwise addition of the diamine to the extended hub followed is by addition of the intermediate of Example 1 and amine end cap will reduce competitive side reactions.

17. Synthesis of compound (r)

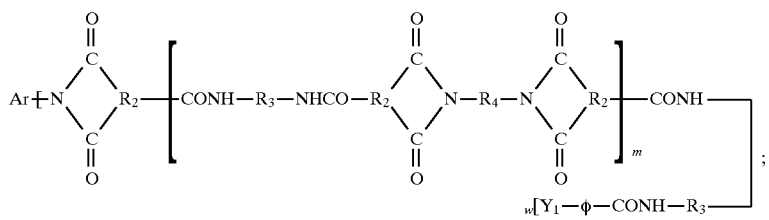

An aromatic amine hub is reacted with an acid anhydride of the formula:

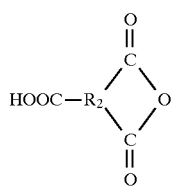

to form an acid hub intermediate which is reacted with a diamine of the formula $H_2N$—$R_3$—$NH_2$, a dicarboxylic acid or acid halide intermediate of Example 1, and an acid or acid halide end cap in the ratio of 1 mole hub intermediate:(w)(m+1) moles diamine:(w) (m) moles dicarboxylic acid intermediate:w moles end cap to yield the desired product.

Alternatively, a similar product can be formed by reacting an amine hub with the dianhydride intermediate of Example 2, a diamine of the formula $H_2N$—$R_3$—$NH_2$, and acid anhydride of the formula:

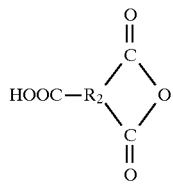

a second diamine of the formula $H_2N$—$R_3$—$NH_2$, and an acid halide end cap in a stepwise reaction.

18. Synthesis of compound (s)

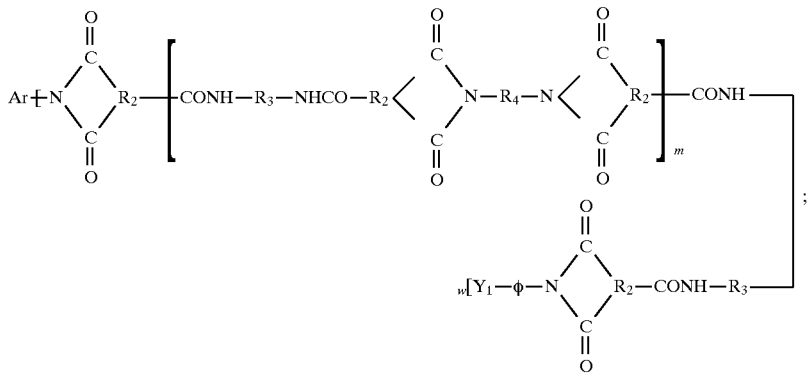

An aromatic amine hub is reacted with the dianhydride intermediate of Example 2, a diamine of the formula $H_2N-R_3-NH_2$, and an amine end cap in the ratio of 1 mole hub:2 w moles intermediate:w moles diamine:w moles end cap to yield the desired product.

19. Synthesis of compound (t)

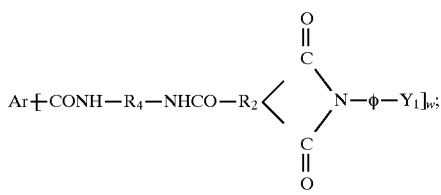

An aromatic acid hub is reacted with a diamine, an acid anhydride, and an amine end cap in the ratio of 1 mole hub:w moles diamine:w moles acid anhydride:w moles end cap to yield the desired product. Preferably, the reaction includes the steps of reacting the acid anhydride with the end cap prior to addition of the hub and diamine.

20. Synthesis of compound (u)

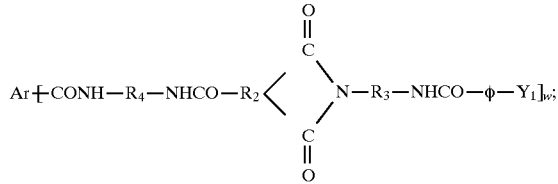

An aromatic acid hub is reacted with a diamine to form an amine extended hub conjugate that is reacted with an acid halide anhydride, another diamine, and an acid halide end cap to yield the desired product. Preparing an end cap conjugate by reacting the second diamine with the end cap prior to the addition of the other reactants reduces side or competitive reactions.

21. Synthesis of compound (v)

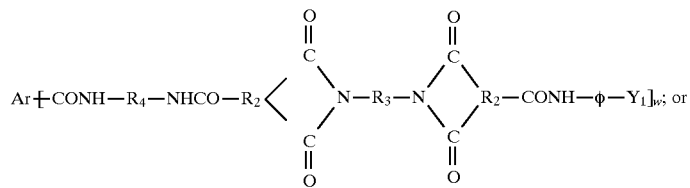

An aromatic acid hub is reacted with a diamine, the intermediate of Example 1, and an amine end cap in the ratio of 1 mole hub:w moles diamine:w moles intermediate:w moles end cap. Preferably, the reaction occurs in two stages with the hub being mixed with the diamine to form an amine conjugate to which the acid or acid halide intermediate and end cap is added simultaneously.

22. Synthesis of amideimide having one diamine

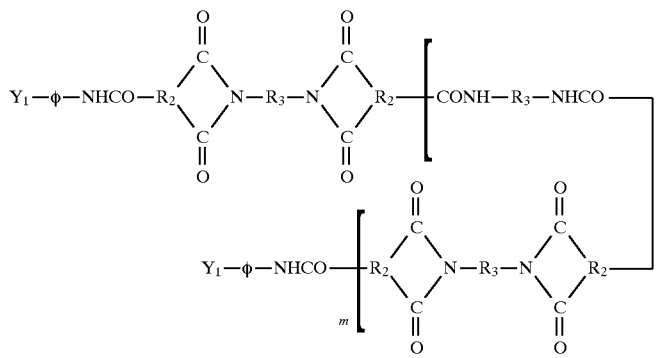

Two moles of an amine end cap are reacted with about (m+2) moles of an acid anhydride, such as phthalyl acid anhydride, and about (2 m+1) moles of a diamine, such as $H_2N-\phi-SO_2-\phi-O-\phi-SO_2-\phi-NH_2$, to yield the desired product. To avoid side or competitive reactions, it is probably desirable to prepare a dicarboxylic acid intermediate of the formula:

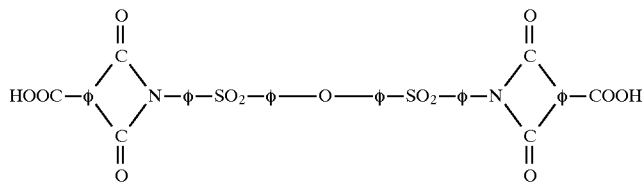

by mixing the acid anhydride and diamine in the ratio of about 2 moles acid anhydride:1 mole diamine prior to adding the remaining reactants for simultaneous condensation to the oligomer.

Comparable oligomers to those described in Examples 1–21 can be prepared by using the same diamine ($H_2N-R_3-NH_2$) in the condensation reaction to prepare the intermediate acids or anhydrides and in the oligomeric condensation. That is, in these oligomers, $R_3$ is the same as $R_4$.

23. Synthesis of a multidimensional polyamide

The oligomer is prepared by reacting:

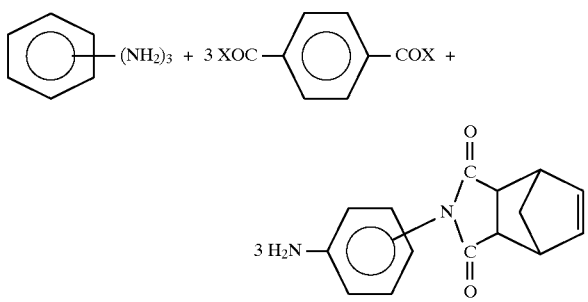

under an inert atmosphere to yield:

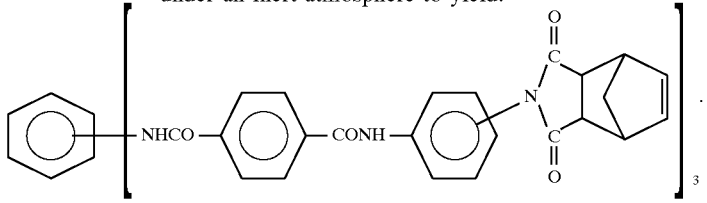

24. Synthesis of another polyamide

Another preferred multidimensional oligomer is prepared by reacting:

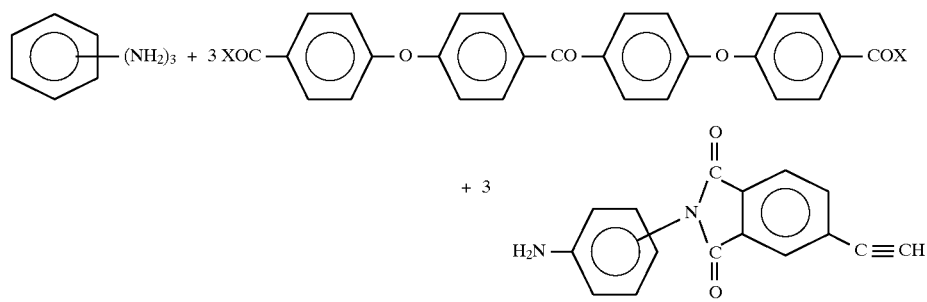

under an inert atmosphere to yield:

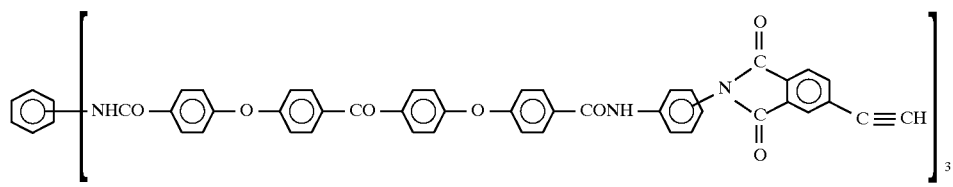

wherein q=—SO$_2$—, —CO—, —S—, or —(CF$_3$)$_2$C—, and preferably —SO$_2$— or —CO—

25. Synthesis of a difunctional, multidimensional polyamide

The oligomer is prepared by reacting:

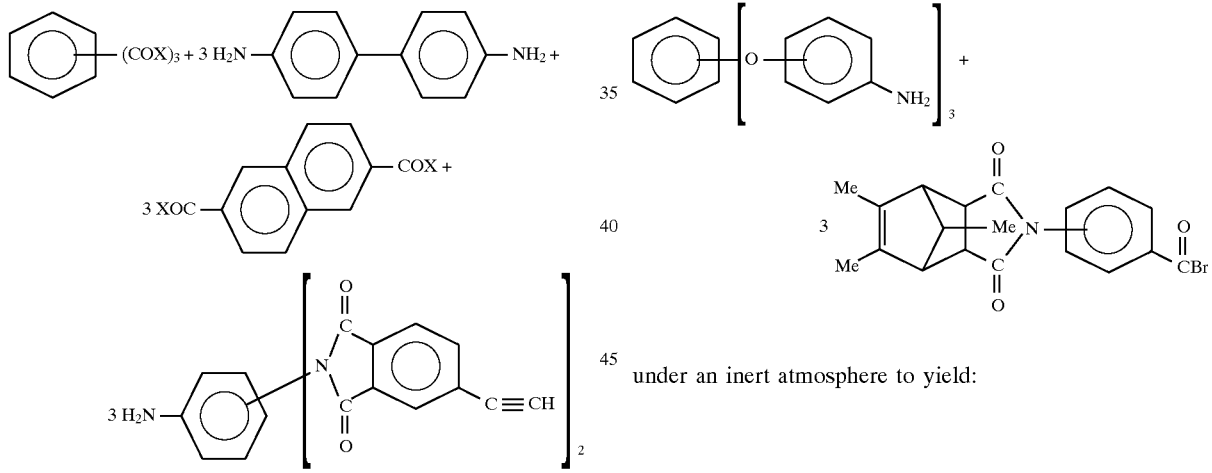

under an inert atmosphere to yield:

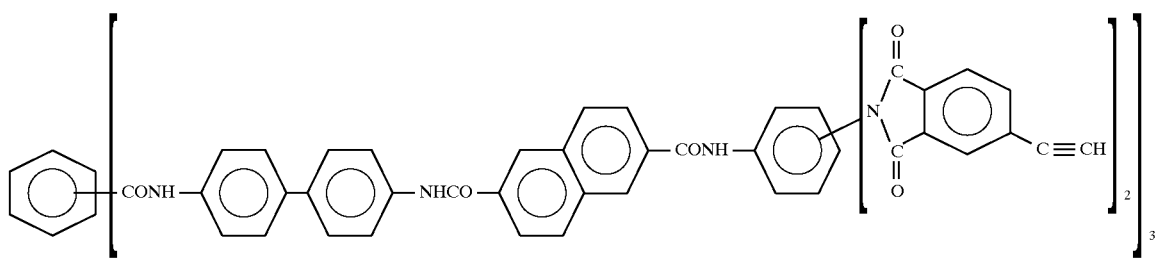

Competitive side reactions between the reactants in Example 25 will likely hinder the yield of this product and will make isolation of the product difficult. Yield can be enhanced by adding the reactants serially, but the physical properties of the resulting oligomers might be impaired.

26. Synthesis using an etheramine hub

Yet another multidimensional oligomer is prepared by reacting:

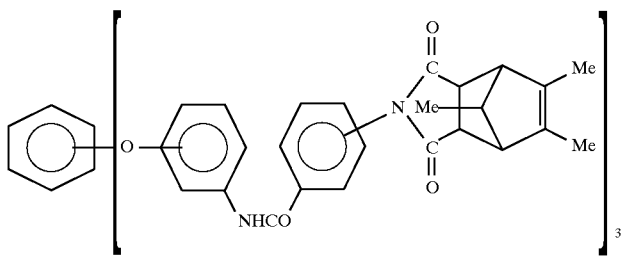

27. Synthesis of a multidimensional polyamide using anhydride end cap

The oligomer is prepared by reacting:

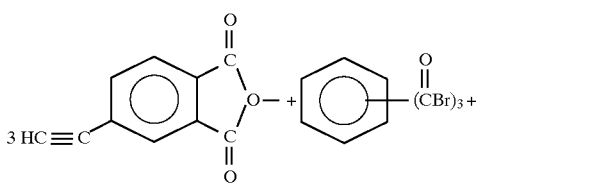

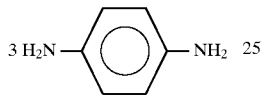

under an inert atmosphere to yield:

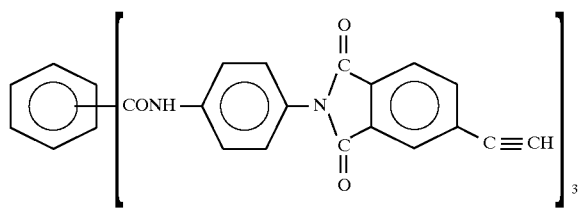

28. Synthesis using melamine as a hub

The oligomer is prepared by reacting melamine with nadic anhydride to yield:

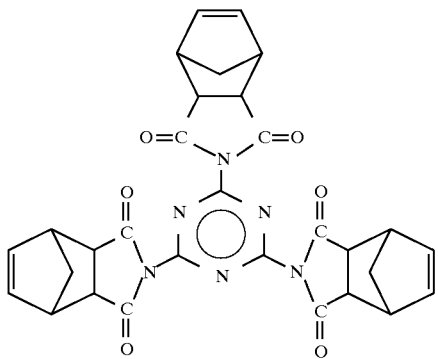

29. Synthesis of a polyamide having an acid halide hub, a diamine arms, and anhydride end caps The oligomer is prepared by reacting about 1 mole of

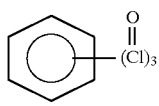

with about 3 moles of phenylenediamine and about 3 moles of

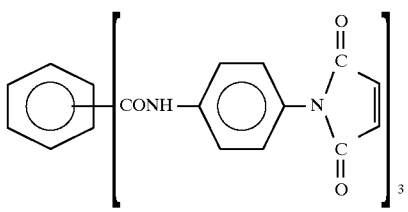

to yield primarily:

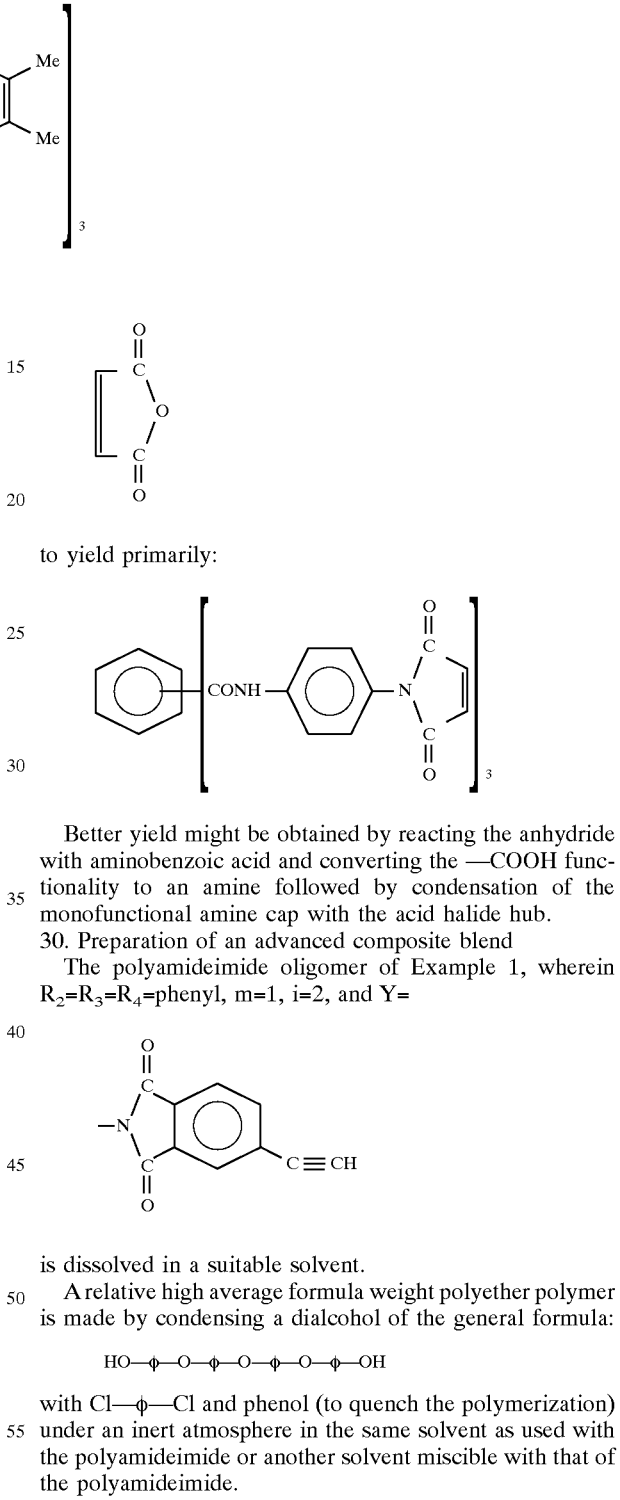

Better yield might be obtained by reacting the anhydride with aminobenzoic acid and converting the —COOH functionality to an amine followed by condensation of the monofunctional amine cap with the acid halide hub.

30. Preparation of an advanced composite blend

The polyamideimide oligomer of Example 1, wherein $R_2=R_3=R_4$=phenyl, m=1, i=2, and Y= is dissolved in a suitable solvent.

A relative high average formula weight polyether polymer is made by condensing a dialcohol of the general formula:

HO—ϕ—O—ϕ—O—ϕ—O—ϕ—OH with Cl—ϕ—Cl and phenol (to quench the polymerization) under an inert atmosphere in the same solvent as used with the polyamideimide or another solvent miscible with that of the polyamideimide.

The two solutions are mixed to form the advanced composite blend, which can be prepregged or dried prior to curing to an advanced amideimide/ether composite.

31. Preparation of a multidimensional advanced composite blend

A multidimensional, polyether sulfone polymer is prepared by reacting phloroglucinol with Cl—ϕ—Cl and a dialcohol of the general formula: HO—ϕ—O—ϕ—$SO_2$—ϕ—O—ϕ—OH. The polymerization is quenched with either ϕ—Cl or phenol. The condensation occurs in a suitable solvent under an inert atmosphere. The product is not recovered from the solvent.

A multidimensional, polyamide oligomer is prepared in the same solvent as used for the polymer or in another miscible solvent by condensing cyuranic acid chloride with

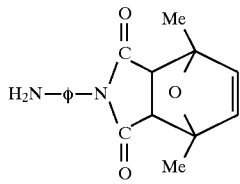

The product is not recovered, but the reaction mixture is mixed with the polymer product to form a multidimensional advanced composite blend that can be prepregged or dried prior to curing to form a multidimensional, polyamide/ polyethersulfone, advanced composite.

Those skilled in the art will readily recognize alterations, variations, or modifications which might be made to the preferred embodiments that have been described without departing from the inventive concept. Therefore, the claims should be interpreted liberally with the support of the full range of equivalents known to those of ordinary skill based upon this description. The claims should be limited only as is necessary in view of the pertinent prior art.

We claim:

1. A phenylethynyl-capped imide of the formula:

wherein

A is an aromatic, aliphatic, or aromatic/aliphatic imide residue;

Y is

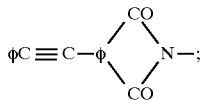

and

Ø is phenylene.

2. The imide of claim 1 wherein A is made by condensing a dianhydride monomer and a diamine monomer and wherein the dianhydride is

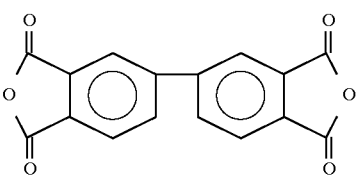

and the diamine is

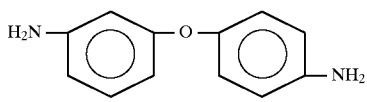

or

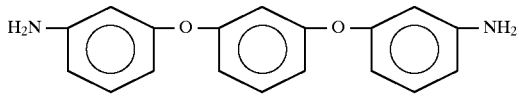

or a mixture thereof.

3. A phenylethynyl-terminated imide of the formula:

wherein i is 2;

Y is

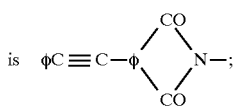

Ø is phenylene; and

A is an aromatic or aromatic/aliphatic imide residue that includes at least one segment of the formula:

4. The imide of claim 3 wherein A is an alternating imide made by the condensation of a dianhydride and a diamine.

5. The imide of claim 4 wherein A is aromatic.

6. The imide of claim 3 wherein A is aromatic.

7. A phenylethynyl-terminated imide of the formula:

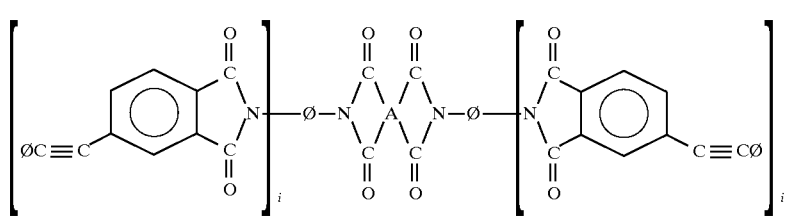

wherein i is 1 or 2;

ø is phenylene; and

A is the residue of a dianhydride.

8. The imide of claim 7 wherein i is 2.

9. The imide of claim 7 wherein A includes alternating residues of a dianhydride monomer and a diamine monomer.

10. The imide of claim 9 wherein the dianhydride is

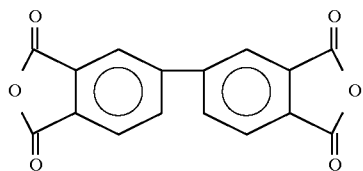

and the diamine is

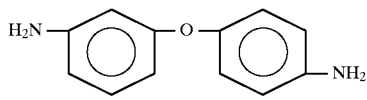

or

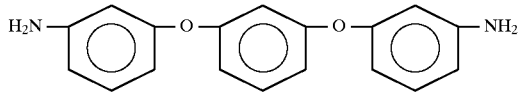

or a mixture thereof.

11. The imide of claim 7 wherein A is aromatic.

12. A phenylethynyl-terminated imide of the formula:

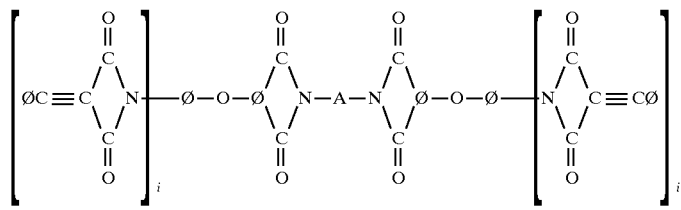

wherein i is 1 or 2;

ø is phenylene; and

A is the residue of a diamine.

13. A method for making a phenylethynyl-terminated imide, comprising the step of:

condensing a monoamine of the formula:

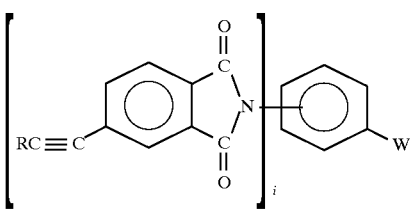

wherein i is 1 or 2;

W is —$NH_2$; and

R is phenylene with an anhydride functionality or its equivalent to form an imide linkage.

* * * * *